(12) United States Patent
Wada et al.

(10) Patent No.: US 10,904,159 B2
(45) Date of Patent: Jan. 26, 2021

(54) RESOURCE ALLOCATION OPTIMIZING SYSTEM AND METHOD

(71) Applicant: HITACHI, LTD., Tokyo (JP)

(72) Inventors: Kiyomi Wada, Tokyo (JP); Hironori Emaru, Tokyo (JP); Mineyoshi Masuda, Tokyo (JP)

(73) Assignee: Hitachi, Ltd., Tokyo (JP)

(*) Notice: Subject to any disclaimer, the term of this patent is extended or adjusted under 35 U.S.C. 154(b) by 201 days.

(21) Appl. No.: 16/125,984

(22) Filed: Sep. 10, 2018

(65) Prior Publication Data

US 2019/0132256 A1 May 2, 2019

(30) Foreign Application Priority Data

Oct. 30, 2017 (JP) ................. 2017-209178

(51) Int. Cl.
| | |
|---|---|
| G06F 15/16 | (2006.01) |
| H04L 12/911 | (2013.01) |
| H04L 12/24 | (2006.01) |
| G06N 20/00 | (2019.01) |
| G06F 9/50 | (2006.01) |
| H04L 12/26 | (2006.01) |
| H04L 29/08 | (2006.01) |

(52) U.S. Cl.
CPC ............ *H04L 47/70* (2013.01); *G06F 9/50* (2013.01); *G06N 20/00* (2019.01); *H04L 41/147* (2013.01); *H04L 41/22* (2013.01); *H04L 41/5009* (2013.01); *H04L 41/5054* (2013.01); *H04L 43/067* (2013.01); *H04L 67/10* (2013.01)

(58) Field of Classification Search
CPC ............................................. G06F 2209/5019
USPC ........................................................ 709/226
See application file for complete search history.

(56) References Cited

U.S. PATENT DOCUMENTS

| | | | |
|---|---|---|---|
| 9,753,782 B2* | 9/2017 | Fang | H04L 67/1008 |
| 10,169,720 B2* | 1/2019 | Chien | G06N 5/04 |
| 2013/0283266 A1* | 10/2013 | Baset | G06F 9/4856 718/1 |
| 2014/0289412 A1* | 9/2014 | Doddavula | H04L 41/5003 709/226 |
| 2015/0286507 A1* | 10/2015 | Elmroth | G06F 9/5061 718/104 |
| 2017/0344393 A1* | 11/2017 | Ansari | G06F 9/5083 |

(Continued)

FOREIGN PATENT DOCUMENTS

WO WO 2014/047073 A1 3/2014

*Primary Examiner* — Hamza N Algibhah
(74) *Attorney, Agent, or Firm* — Baker Botts L.L.P.

(57) ABSTRACT

It is necessary to allocate sufficient surplus resources to each service in order to maintain a service level of each service, but, as a result, many resources which are not used may be necessary.

A resource allocation optimizing system performs, with respect to each of a plurality of services, a predictive judgement which is a determination of whether or not accurate prediction of a workload of the service is able to be anticipated, and controls allocation of a resource to the service on the basis of a result of the predictive judgement. With respect to each service, the predictive judgement is performed on the basis of at least one of (x) time-series measured workloads and time-series predicted workloads in a predefined period for the service and (y) at least one of a measured service level and a predicted service level in the predefined period for the service.

14 Claims, 14 Drawing Sheets

(56) References Cited

U.S. PATENT DOCUMENTS

| | | | |
|---|---|---|---|
| 2018/0006903 A1* | 1/2018 | Ganguli | H04L 67/1008 |
| 2018/0026905 A1* | 1/2018 | Balle | G06F 1/20 |
| | | | 709/226 |
| 2018/0101405 A1* | 4/2018 | Narayanamurthy | G06F 9/4887 |
| 2018/0101415 A1* | 4/2018 | Mahindru | G06F 11/3034 |
| 2018/0176148 A1* | 6/2018 | Ku | H04L 47/823 |
| 2018/0302340 A1* | 10/2018 | Alvarez Callau | H04L 47/76 |
| 2019/0235922 A1* | 8/2019 | Iovanna | G06F 9/505 |
| 2020/0026560 A1* | 1/2020 | Singh | G06F 9/5005 |
| 2020/0034197 A1* | 1/2020 | Nagpal | G06F 9/50 |

\* cited by examiner

FIG. 6

Input table group 221

601 CONFIGURATION TABLE
611 SERVICE ID
612 HOST STORAGE DOMAIN ID
613 STORAGE ID
614 LDEV_ID

602 RELATION TABLE
621 STORAGE ID
622 LDEV_ID
623 COMPONENT TYPE
624 COMPONENT ID
625 CAPACITY

603 MEASURED RESPONSE PERFORMANCE TABLE
631 DATE TIME
632 SERVICE ID
633 MEASURED I/O LOAD
634 MEASURED RESPONSE TIME

605 MEASURED METRIC TABLE
651 DATE TIME
652 STORAGE ID
653 COMPONENT ID
654 METRIC TYPE
655 MEASURED METRIC

606 METRIC THRESHOLD TABLE
661 STORAGE ID
662 COMPONENT TYPE
663 COMPONENT ID
664 METRIC TYPE
665 METRIC THRESHOLD

604 RESPONSE TIME THRESHOLD TABLE
641 SERVICE ID
642 IMPORTANCE
643 RESPONSE TIME THRESHOLD

FIG. 7

Work table group 223

| 701 | I/O LOAD PREDICTION MODEL TABLE |
|---|---|
| 711 | MODEL ID |
| 712 | START DATE TIME |
| 713 | END DATE TIME |
| 714 | SERVICE ID |
| 715 | FUNCTION EXPRESSION f(t) |

| 702 | RESPONSE TIME PREDICTION MODEL TABLE |
|---|---|
| 721 | MODEL ID |
| 722 | START DATE TIME |
| 723 | END DATE TIME |
| 724 | SERVICE ID |
| 725 | FUNCTION EXPRESSION f(I/O) |

| 703 | METRIC PREDICTION MODEL TABLE |
|---|---|
| 731 | MODEL ID |
| 732 | START DATE TIME |
| 733 | END DATE TIME |
| 734 | STORAGE ID |
| 735 | COMPONENT ID |
| 736 | METRIC TYPE |
| 737 | FUNCTION EXPRESSION f(I/O) |

FIG. 8

Output table group 224

| 801 | RELATION TABLE |
|---|---|
| 811 | SERVICE ID |
| 812 | STORAGE REGION ID |
| 813 | STORAGE ID |
| 814 | COMPONENT TYPE |
| 815 | COMPONENT ID |

| 805 | PREDICTED RESPONSE PERFORMANCE TABLE |
|---|---|
| 851 | DATE TIME |
| 852 | SERVICE ID |
| 853 | PREDICTED I/O LOAD |
| 854 | PREDICTED RESPONSE TIME |

| 808 | PREDICTED METRIC TABLE |
|---|---|
| 881 | DATE TIME |
| 882 | STORAGE ID |
| 883 | COMPONENT ID |
| 884 | METRIC TYPE |
| 885 | PREDICTED METRIC |

| 809 | PREDICTIVE JUDGEMENT RESULT TABLE |
|---|---|
| 891 | SERVICE ID |
| 892 | START DATE TIME |
| 893 | END DATE TIME |
| 894 | TOLERANCE |
| 895 | PREDICTIVE JUDGEMENT RESULT |

RESOURCE ALLOCATION OPTIMIZING SYSTEM AND METHOD

CLAIM OF PRIORITY

The present application claims benefit of priority to Japanese Patent Application No. 2017-209178, filed on Oct. 30, 2017, the content of which is hereby incorporated by reference into this application.

TECHNICAL FIELD

The present invention relates generally to optimization of allocation of a resource.

BACKGROUND ART

Generally, a computer system such as a cloud infrastructure provides a plurality of services to one or more users. Typically, a resource (computing resource) in the computer system is allocated to each service. Each service is provided by executing an application (application program) corresponding to the service. A resource allocated to a service corresponding to an application is used for execution of the application.

PTL 1 discloses "a request for initialization of a new instance of a virtual machine instance configuration, the virtual machine instance configuration associated with an expected resource usage amount of a first computing resource, wherein the expected usage amount is based at least in part on a plurality of prior measurements associated with usage, by instances of one or more a similar virtual machine instance configurations, of the first computing resource". In other words, the virtual machine instance configuration is associated with an expected resource usage amount of a first computing resource, and the expected usage amount is based on at least a plurality of prior measurements.

CITATION LIST

Patent Literature

PTL 1: WO2014/047073

SUMMARY OF INVENTION

Technical Problem

Generally, surplus resources are allocated to each service such that a service level (service quality) can be maintained even if a workload for the service is changed or a failure occurs in a resource.

According to the technique disclosed in PTL 1, a resource usage amount can be predicted, but a workload for a service cannot be predicted. Thus, it is necessary to allocate sufficient surplus resources to each service in order to maintain a service level of each service. As a result, many resources which are not used may be necessary. For example, generally, a cloud infrastructure which is an example of a computer system provides a plurality of services. It is assumed that surplus resources which are twice stronger than in a steady state are allocated to any service as sufficient surplus resources. In this case, only resources which are less than 50% are used in the entire cloud infrastructure in the steady state.

Solution to Problem

A resource allocation optimizing system performs, with respect to each of a plurality of services, a predictive judgement which is a determination of whether or not accurate prediction of a workload of the service is able to be anticipated, and controls allocation of a resource to the service on the basis of a result of the predictive judgement. With respect to each service, the predictive judgement is performed on the basis of at least one of (x) time-series measured workloads and time-series predicted workloads in a predefined period for the service and (y) at least one of a measured service level and a predicted service level in the predefined period for the service.

With respect to each service, time-series measured service levels may correspond to time-series measured workloads, and time-series predicted service levels may correspond to time-series predicted workloads. The "plurality of services" may be services provided by a single user (for example, a single customer), and may be services provided by a plurality of users of a computer system such as an identical cloud infrastructure.

Advantageous Effects of Invention

According to the present invention, a capacity required to maintain a service level of each service can be maintained to be an appropriate amount.

BRIEF DESCRIPTION OF DRAWINGS

FIG. 6 is a configuration diagram of an input table group.

FIG. 7 is a configuration diagram of a work table group.

FIG. 8 is a configuration diagram of an output table group.

DESCRIPTION OF EMBODIMENTS

Figure 1:
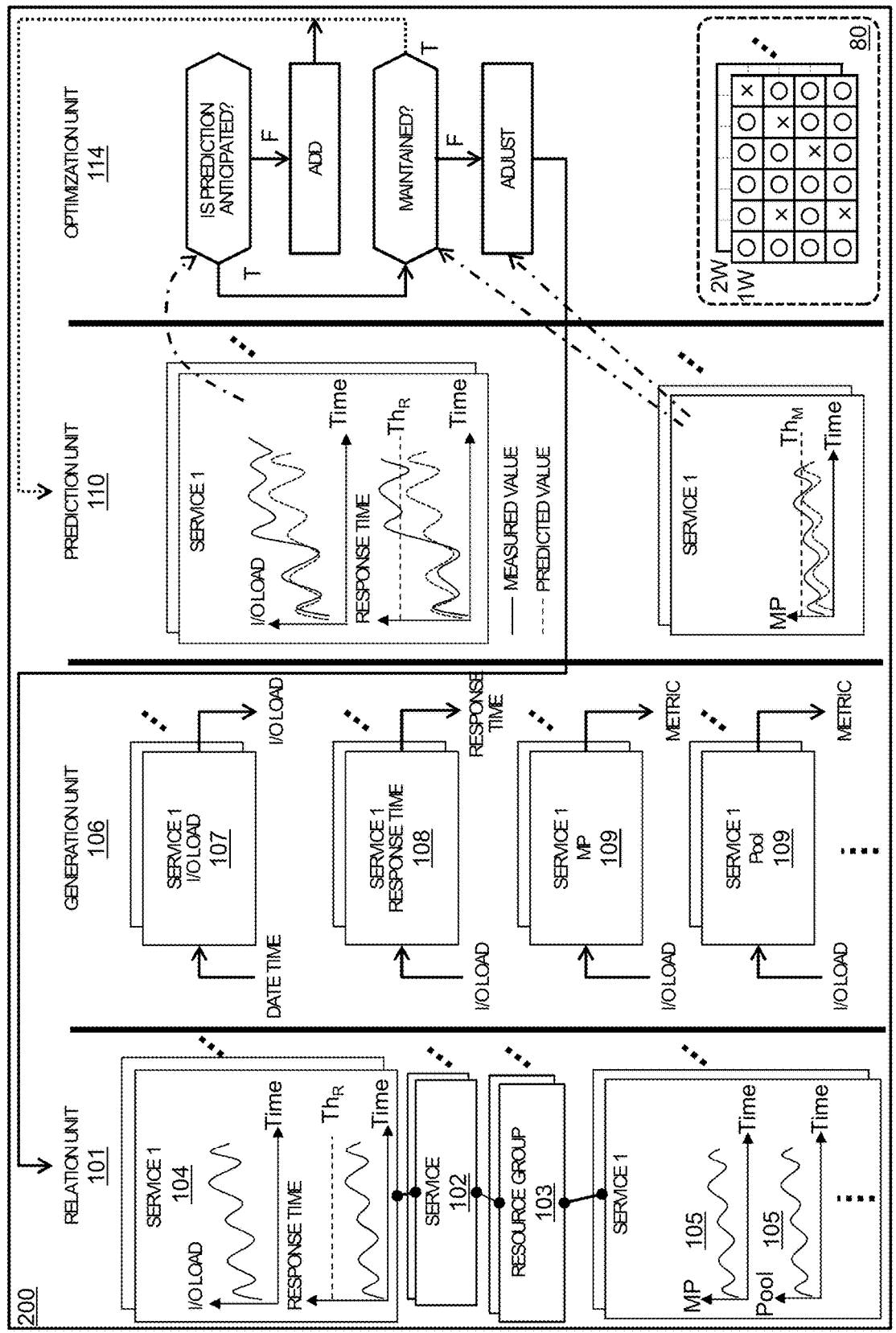
FIG. 1 is a summary diagram of a resource allocation optimizing system according to an embodiment of the present invention.

In the following description, an "interface unit" may be one or more interfaces. The one or more interfaces may include at least a communication interface unit of a user interface unit and the communication interface unit. The user interface unit may be at least one I/O device among one or more I/O devices (for example, input devices (for example, a keyboard and a pointing device) and output devices (for example, display devices)) and a display computer, and may be an interface device for the at least one I/O device instead thereof or in addition thereto. The communication interface unit may be one or more communication interface devices. The one or more communication interface devices may be one or more communication interface devices (for example, one or more Network Interface Cards (NICs)) of the identical kind, and may be two or more communication interface devices (for example, NIC and Host Bus Adapter (HBA)) of the different kinds.

In the following description, a "memory unit" may be one or more memories. At least one memory may be a volatile memory or a nonvolatile memory. The memory unit is generally used for a process performed by a processor unit.

In the following description, a "PDEV" may be one or more PDEVs. The "PDEV" indicates a physical storage device, and is typically a nonvolatile storage device (for example, an auxiliary storage device), for example, a hard disk drive (HDD) or a solid state drive (SSD). The PDEV unit may be a RAID group. The "RAID" stands for Redundant Array of Independent (or Inexpensive) Disks.

In the following description, a "storage section" includes at least a memory unit among the memory unit and the PDEV unit.

In the following description, the "processor unit" may be one or more processors. At least one processor is typically a microprocessor such as a central processing unit (CPU), but may be a processor of other kinds such as a graphics processing unit (GPU). Each of one or more processors may be a single-core processor, and may be a multi-core processor. Some of the processors may be hardware circuits which perform a part or the whole of a process.

In the following description, a function may be described in the expression of a "kkk unit" (excluding the interface unit, the storage section, and the processor unit), but the function may be realized by the processor unit executing one or more computer programs, and may be realized by one or more hardware circuits (for example, a field-programmable gate array (FPGA) or an application specific integrated circuit (ASIC)). In a case where the function is realized by the processor unit executing the program, a predefined process is performed by appropriately using the storage section and/or the interface unit, and thus the function may be regarded as at least a part of the processor unit. A process described with a function as a subject may be a process performed by the processor unit or a device having the processor unit. The program may be installed from a program source. The program source may be, for example, a program distribution computer or a computer readable recording medium (for example, a non-transitory recording medium). A description of each function is only an example, and a plurality of functions may be integrated into a single function, and a single function may be divided into a plurality of functions.

In the following description, information may be described in the expression of an "xxx table", but the information may be expressed in any data structure. In other words, an "xxx table" may be described as "xxx information" in order to show that information does not depend on a data structure. In the following description, a configuration of each table is only an example, and a single table may be divided into two or more tables, and all or some of two or more tables may be a single table.

In the following description, in a case where elements of the identical kind are described without being differentiated from each other, a reference numeral of the elements may be used (for example, a service 102), and, in a case where elements of the identical kind are described to be differentiated from each other, IDs of the element may be used (for example, a service 1).

In the following description, a "resource allocation optimizing system" may be configured with one or more computers. Specifically, for example, in a case where a computer includes a display device, and the computer displays information on the display device, the computer may be the resource allocation optimizing system. For example, in a case where a first computer (for example, a server) transmits display information to a remote second computer (a display computer (for example, a client)), and the display computer displays the information (in a case where the first computer displays information in the second computer), at least the first computer of the first computer and the second computer may be the resource allocation optimizing system. The resource allocation optimizing system may include an interface unit, a storage section, and a processor unit connected thereto. The computer in the resource allocation optimizing system "displaying display information" may be to display the display information on a display device of the computer, and may be that the computer transmits the display information to a display computer (in the latter case, the display information is displayed by the display computer).

In the following description, a "resource" is typically a computing resource, and is a generic term for a physical resource and a logical resource. The resource may be each of a plurality of nodes (for example, servers or storage devices) configuring a computer system, and may be each of a plurality of components of each node.

In the following description, a "workload" is a work load caused by execution of a service, and employs an input/output (I/O) load of the service (application) as an example. The "I/O load" (IOPS) may employ at least one of the "number of I/O" and an "I/O size". The "number of I/O" is the number of I/O commands issued per unit time. The "I/O size" is a total size of I/O target data based on I/O commands issued per unit time. In the present embodiment, the "number of I/O" is used as the "I/O load".

In the following description, a "service level" is a level (quality) required in a service, and employs, for example, a response time. The "response time" mentioned here is a time until a service (application) receives a response to an I/O command after the service (application) issues the I/O command. A "response time" corresponding to an "I/O load" is a time (for example, an average response time, the minimum response time, or the maximum response time) based on one or more response times respectively corresponding to one or more I/O commands issued per unit time.

In the following description, a "metric" is a metric of a resource. The type of metric depends on the type of resource. For example, in a case where a resource is a microprocessor (MP), the type of metric is a processor utilization. For example, in a case where a resource is a pool, the type of metric is a pool utilization (a ratio of measured IOPS to the maximum IOPS of an allocated pool).

Hereinafter, with reference to the drawings, one embodiment will be described. The present invention is not limited to the following description.

FIG. 1 is a summary diagram of a resource allocation optimizing system according to an embodiment of the present invention.

A resource allocation optimizing system 200 is a system which optimizes allocation of a resource. The resource allocation optimizing system 200 includes an relation unit 101, a generation unit 106, a prediction unit 110, and an optimization unit 114. Each of the relation unit 101, the generation unit 106, the prediction unit 110, and the optimization unit 114 is a function realized by a processor unit executing one or more computer programs in the present embodiment, but some of the functions may be realized by a hardware circuit.

The relation unit 101 relates a resource group (one or more resources) 103 with services 102 for each of the services 102. Consequently, time-series measured response performances 104 and time-series measured metrics 105 are related with each service 102. In the present embodiment, several thousands of services 102 are assumed to be provided by an information system 290 (refer to FIG. 2) which will be described later.

With respect to each service 102, the "time-series response performances" are time-series I/O loads and response times of the service 102. Therefore, the time-series measured response performances 104 are time-series measured I/O loads (time-series data of measured values of I/O loads) and time-series measured response times (time-series data of measured values of response times).

With respect to each service 102, the "time-series metrics" of a resource are time-series metrics of the resource in the resource group 103 related with the service 102. Therefore, the time-series measured metrics 105 of a resource are time-series data of measured metrics (measured values of metrics) of the resource in the resource group 103 related with the service 102.

The generation unit 106 performs a learning process for each service 102. In the learning process for each service 102, the generation unit 106 creates an I/O load prediction model 107 and a response time prediction model 108 by using a corresponding portion of the time-series measured response performances 104 of the service 102. The generation unit 106 creates a metric prediction model 109 by using a corresponding portion (accurately, a corresponding portion of the time-series measured I/O loads) of the time-series measured response performances 104 of the service 102 and a corresponding portion of the time-series measured metrics 105 of a resource related with the service 102.

With respect to each service 102, the "corresponding portion of the time-series measured response performances 104" is all or some of the time-series measured response performances 104 of the service 102, and is time-series data corresponding to an actual learning period among the time-series measured response performances 104 of the service 102. The "actual learning period" is an example of a second period, and is at least a part of a designated learning period, specifically, a period in which a measured response time is equal to or less than a predetermined response time threshold (ThR) in the designated learning period. The "designated learning period" is a learning period which is designated. The "learning period" is a period (time range) in which data used as learning data for creating the prediction models 107 to 109 is included. With respect to each service 102, any learning period may be designated by an administrator of the resource allocation optimizing system 200, any learning period may be designated by a user of the service 102, and an automatically determined or predetermined learning period may be designated by the generation unit 106 (or other functions).

With respect to each service 102, the "corresponding portion of the time-series measured metrics 105" of a resource is time-series data corresponding to the above period among the time-series measured metrics 105 of the resource.

As the prediction models 107 to 109, models created by using existing learning techniques, for example, an autoregressive moving average model (for example, an autoregressive integrated moving average (ARIMA) model) or a neural network may be used. In the present embodiment, the I/O load prediction model 107 is an example of a prediction model created by using a plurality of first value sets (sets of date times and measured I/O loads), and is a function which outputs a predicted I/O load (a predicted value of an I/O load) if a date time and a measured I/O load are input. The response time prediction model 108 is an example of a prediction model created by using a plurality of second value sets (sets of measured I/O loads and measured response times at an identical date time), and is a function which outputs a predicted response time (a predicted value of a response time) if a predicted I/O load and a measured response time are input. The metric prediction model 109 is an example of a prediction model created by using a plurality of third data sets (sets of measured I/O loads and measured metrics at an identical date time), and a function which outputs a predicted metric (a predicted value of a metric) if a predicted I/O load and a measured metric are input.

The prediction unit 110 predicts time-series response performances in a designated prediction period of the service 102 for each service 102, that is, outputs time-series predicted response performances of the service 102. The "time-series predicted response performances" are time-series data of a predicted I/O load and a predicted response time, and time-series data corresponding to a designated prediction period. The "designated prediction period" is an example of a first period, and is a prediction period which is designated. The "prediction period" is a period (time range) in which data which is input to the prediction models 107 to 109 is included. Any prediction period may be designated by an administrator of the resource allocation optimizing system 200, any prediction period may be designated by a user of the service 102, and an automatically determined or predetermined prediction period may be designated by the prediction unit 110 (or other functions). The designated prediction period may be the same for (common to) all of the services 102. The above-described designated learning period is typically a period earlier than the designated prediction period. With respect to each date time in the designated prediction period, a predicted I/O load is an I/O load as an output value corresponding to the date time and a measured I/O load which are input to the I/O load prediction model 107, and a predicted response time is a response time as an output value corresponding to a predicted I/O load (a predicted I/O load corresponding to the date time) and a measured response time which are input to the response time prediction model 108. A date time t (a date time which is input to the prediction model 107) used for prediction is not a date time expressed in year, month, day, hour, minute, and second, but is a numerical value x in a case where a unit time width such as a day or an hour is expressed as an x-th unit time width (where x is, for example, a natural number). For example, in a case where the designated prediction period is one month before today, and a unit time width is a day, the date time t which is input to the prediction model 107 is t=1, 2, 3, . . . , 29, and 30. In other words, thirty date times arranged in a time series are input. A length of a usage actual measurement period which is a period in which a measured I/O load is input to the prediction model 107 is included is the same as a length of the designated prediction period. If the designated prediction period is deviated by m (where m is a time length) (assuming that a sliding width is m) ahead, the usage actual measurement period may also be deviated by m ahead. At least a part of the usage actual measurement period may overlap an actual learning period. The number n of measured I/O loads which are input to the prediction model 107 is the same as the number n of forming the date time t (for example, a measured I/O load of each day in the past one month (thirty days) is input). In other words, n measured I/O loads arranged in a time series are input. As a result, n predicted I/O loads arranged in a time series are output. Similarly, n predicted I/O loads in a time series respectively corresponding to n date times in a time series included in the designated prediction period and n measured response times in a time series included in the usage actual measurement period are input to the prediction model 108, and, as a result, n predicted response times in a time series are output from the prediction model 108.

The prediction unit 110 may predict time-series metrics in a designated prediction period of a resource related with the service 102 for each service 102, that is, may output time-series predicted metrics corresponding to the service 102 and the resource. The "time-series predicted metrics" are time-series data of predicted metrics, and is time-series data corresponding to a designated prediction period. With respect to each date time in the designated prediction period, a predicted metric of a resource related with the service 102 is a metric as an output value corresponding to a predicted I/O load (a predicted I/O load corresponding to the date time) and a measured metric which are input to the metric prediction model 109 corresponding to the service 102 and the resource. Specifically, n predicted I/O loads in a time series respectively corresponding to n date times in a time series included in the designated prediction period and n measured metrics in a time series included in the usage actual measurement period are input to the prediction model 109, and, as a result, n predicted metrics in a time series are output from the prediction model 109.

The optimization unit 114 performs the following processes for each service 102. In other words, the optimization unit 114 performs a predictive judgement which is a determination of whether or not accurate prediction of a workload of the service 102 can be anticipated on the basis of at least one of the following (x) and (y), that is, (x) time-series measured workloads and time-series predicted workloads in a designated prediction period with respect to the service 102 and (y) at least one of a measured service level and a predicted service level in the designated prediction period with respect to the service 102.

The optimization unit 114 controls allocation of a resource to the service 102 on the basis of a result of the predictive judgement. The control of resource allocation may be a determination of an amount of resources to be added or reduced, and may be standby for maintaining the current state.

The predictive judgement includes at least one of determinations in the following (P1) and (P2), that is, (P1) a determination of whether or not a difference between a measured I/O load and a predicted I/O load in a designated prediction period is within a predetermined tolerance (within a margin) and (P2) a determination whether or not at least one of a measured response time and a predicted response time in a designated prediction period is equal to or less than a predetermined response time threshold (ThR).

In a case where at least one of determination results in (P1) and (P2) is false, a result of the predictive judgement is false.

The reason why a result of the predictive judgement is false if a determination result in (P1) is false may be that at least one of the prediction models 107 and 108 is inaccurate since an amount of learning data used to generate the prediction models 107 and 108 in a learning process is small. The reason why an amount of learning data is small may be that the above-described "actual learning period" (an example of a second period) is short since a capacity is not sufficient. In (P1), the "measured I/O load" is a value based on time-series measured I/O loads (for example, the maximum value, the minimum value, or an average value in the time-series measured I/O loads). The "predicted I/O load" is a value based on time-series predicted I/O loads (for example, the maximum value, the minimum value, or an average value in the time-series predicted I/O loads).

The reason why a result of the predictive judgement is false if a determination result in (P2) is false may be that a capacity is insufficient, and thus a response time has already exceeded or will exceed a response time threshold in the future. In (P2), the "measured response time" is the maximum value (or an average value) in time-series measured response times. The "predicted response time" is the maximum value (or an average value) in time-series predicted response times.

The predictive judgement may include (P3) a determination of whether or not a difference between a measured response time and a predicted response time in a designated prediction period is within a predetermined tolerance (within a margin), but the determination in (P3) is regarded to be the same as the determination in (P1) (that is, it is not necessary to include (P3) in addition to (P1)). This is because an I/O load and a response time have a high correlation with each other, and thus there is a high probability that a determination result in (P1) and a determination result in (P3) may be the same as each other. Thus, the determination in (P1) may be regarded to include the determination in (P3).

The predictive judgement may be performed in each designated prediction period (for example, each of a first week to a fourth week) among a plurality of consecutive designated prediction periods (for example, one month).

With respect to the service 102 for which a result of the predictive judgement is false, the optimization unit 114 determines that a resource group is to be added to the target service 102. The resource group to be added may be a predetermined type of resource (for example, all types of resources). The resource group to be added may be a predetermined amount of resources, and may be a resource group in an amount determined according to at least one of an I/O load difference and an excessive difference. Any of the capacities is a capacity to the extent to which a result of a re-predictive judgement performed through relearning after the resource group is added may be sufficiently high. The "I/O load difference" is a difference between a measured I/O load and a predicted I/O load. The "measured I/O load" and the "predicted I/O load" here may be the same meanings as those in the determination in (P1). The "excessive difference" is a difference between a measured response time or a predicted response time exceeding the response time threshold (ThR) and the response time threshold (ThR). In a case where there is a service for which a result of the predictive judgement is true, the optimization unit 114 causes a resource group (capacity) reduced from the service to be preferentially included in a resource group (capacity) to be added. This contributes to the entire optimization.

On the other hand, in a case where both of determination results in (P1) and (P2) are true, a result of the predictive judgement is true. With respect to each resource in the resource group 103 related with the service 102 for which a result of the predictive judgement is true, the optimization unit 114 performs a maintenance determination which is a determination of whether or not a capacity of the resource is to be currently maintained. The maintenance determination includes at least one of determinations in the following (K1) to (K3), that is, (K1) a determination of whether or not a measured response time in a designated prediction period is equal to or less than the response time threshold (ThR), (K2) a determination of whether or not a difference between a measured metric and a predicted metric in a designated prediction period is within an tolerance, and (K3) a determination of whether or not at least one of a measured metric and a predicted metric in a designated prediction period is equal to or less than a metric threshold (ThM).

In (K1), the "measured response time" may be the same meaning as the "measured response time" in (P2).

In (K2), the "measured metric" is a value based on time-series measured metrics (for example, the maximum value, the minimum value, or an average value in the time-series measured metrics). The "predicted metrics" is a value based on time-series predicted metrics (for example, the maximum value, the minimum value, or an average value in the time-series predicted metrics).

In (K3), the "measured metric" is the maximum value (or an average value) in time-series measured metrics. The "predicted metric" is the maximum value (or an average value) in time-series predicted metrics.

In the maintenance determination, the time-series predicted metrics are time-series data of predicted metrics in a designated prediction period. The time-series predicted metrics may be acquired by the optimization unit 114 calling the prediction unit 110 in a case where a result of the predictive judgement is true, and may be acquired by the prediction unit 110 predicting time-series metrics in asynchronization with the predictive judgement.

In a case where at least one of determination results in (K1) to (K3) is false, a result of the maintenance determination is false. The optimization unit 114 determines an adjustment resolution amount (a capacity to be reduced or a capacity to be added) for the service 102 for which a result of the maintenance determination is false. Specifically, for example, the optimization unit 114 determines a capacity of a resource for which a maintenance determination result is false, on the basis of at least one of a measured metric (for example, the maximum value or an average value in time-series measured metrics) in a designated prediction period of the resource and a predicted metric (for example, the maximum value or an average value in time-series predicted metrics). A difference between the determined capacity and the current capacity is the adjustment capacity (a capacity to be reduced or added). The adjustment capacity may be determined on the basis of a difference between a measured metric or a predicted metric (for example, the maximum value) exceeding the metric threshold (ThM) and the metric threshold (ThM).

The optimization unit 114 stands by in order to maintain the current state with respect to the service 102 for which a result of the maintenance determination is true. Thereafter, for example, the above-described predictive judgement is performed with respect to the next designated prediction period.

The optimization unit 114 may create a predictive judgement result aggregation 80 (results of predictive judgements in designated prediction periods for all of the services 102). In FIG. 1, cells in the aggregation 80 corresponds to the services 102. With respect to the predictable service (a service for which a result of the predictive judgement is true) 102, a capacity is reduced or added as long as the current state is not maintained such that an amount of a resource group in which a peak value of a predicted metric is equal to or less than the metric threshold (ThM) is allocated to the service 102. On the other hand, a predetermined amount of a resource group (or a resource group in a capacity determined on the basis of at least one of an I/O load difference or an excessive difference) is added to the unpredictable service (a service for which a result of the predictive judgement is false) 102. In a case where there is a surplus resource reduced from a predictable service, the surplus resource may be preferentially included in a resource group to be added to an unpredictable service as described above.

After the resource group is added or reduced, relation (update of relation) is performed by the relation unit 101, and a relearning process (update of the prediction models 107 to 109) is performed by the generation unit 106.

The above description is a summary of the present embodiment.

In the present embodiment, each of a plurality of services 102 is subjected to a predictive judgement so as to be classified into a predictable service and an unpredictable service.

The prediction models 107 to 109 corresponding to predictable services are regarded to be accurate. Thus, with respect to the predictable service, the optimization unit 114 determines an adjustment capacity according to the above-described method. Thus, a capacity of a resource group allocated to a predictable service can be maintained to be an amount suitable for a response time to be maintained to be equal to or less than the response time threshold (ThR) (in other words, it is possible to prevent a state in which an excessive capacity is allocated).

On the other hand, the prediction models 107 to 109 corresponding to unpredictable services are regarded to be inaccurate since a measured response time in a learning period exceeds the response time threshold (ThR). Thus, a predetermined amount (or a resource group in a capacity determined on the basis of at least one of an I/O load difference and an excessive difference) of a resource group is added to an unpredictable service. A capacity to be added is a capacity in which a measured response time in the designated learning period is sufficiently anticipated to be equal to or less than the response time threshold (ThR). Thus, in the relearning process, the prediction models 107 to 109 are updated to more accurate prediction models 107 to 109, and, as a result, it is anticipated that an I/O load and a response time can be accurately predicted in the subsequent process. Therefore, with respect to the service 102, an allocable capacity of a resource group can be maintained to be an amount suitable for a response time to be maintained to be equal to or less than the response time threshold (ThR) (in other words, it is possible to prevent a state in which an excessive capacity is allocated).

In the present embodiment, surplus resources (resources more than resources in a capacity which is estimated to be necessary in the service 102) may be allocated to each service 102 in advance. In one comparison example, surplus resources are excessively necessary since the predictive judgement as described above is not possible, but, in the present embodiment, with respect to the service 102, a capacity can be maintained to be an amount suitable for a response time to be maintained to be equal to or less than the response time threshold (ThR).

In the above description, regarding the determination in (P2), even if a predicted response time in a designated prediction period exceeds the response time threshold (ThR), in a case where a total of exceeding times is equal to or less than P seconds (where P0), a determination result in (P2) may be true.

Similarly, regarding the determination in (K1), even if a measured response time in a designated prediction period exceeds the response time threshold (ThR), in a case where a total of exceeding times is equal to or less than Q seconds (where Q≥0), a determination result in (K1) may be true.

With respect to each resource, regarding the determination in (K3), even if a measured metric or a predicted metric in a designated prediction period exceeds the metric threshold (ThM) corresponding to the resource, in a case where a total of exceeding times is equal to or less than R seconds (where R≥0), a determination result in (K3) may be true.

Hereinafter, the present embodiment will be described in detail.

Figure 2:
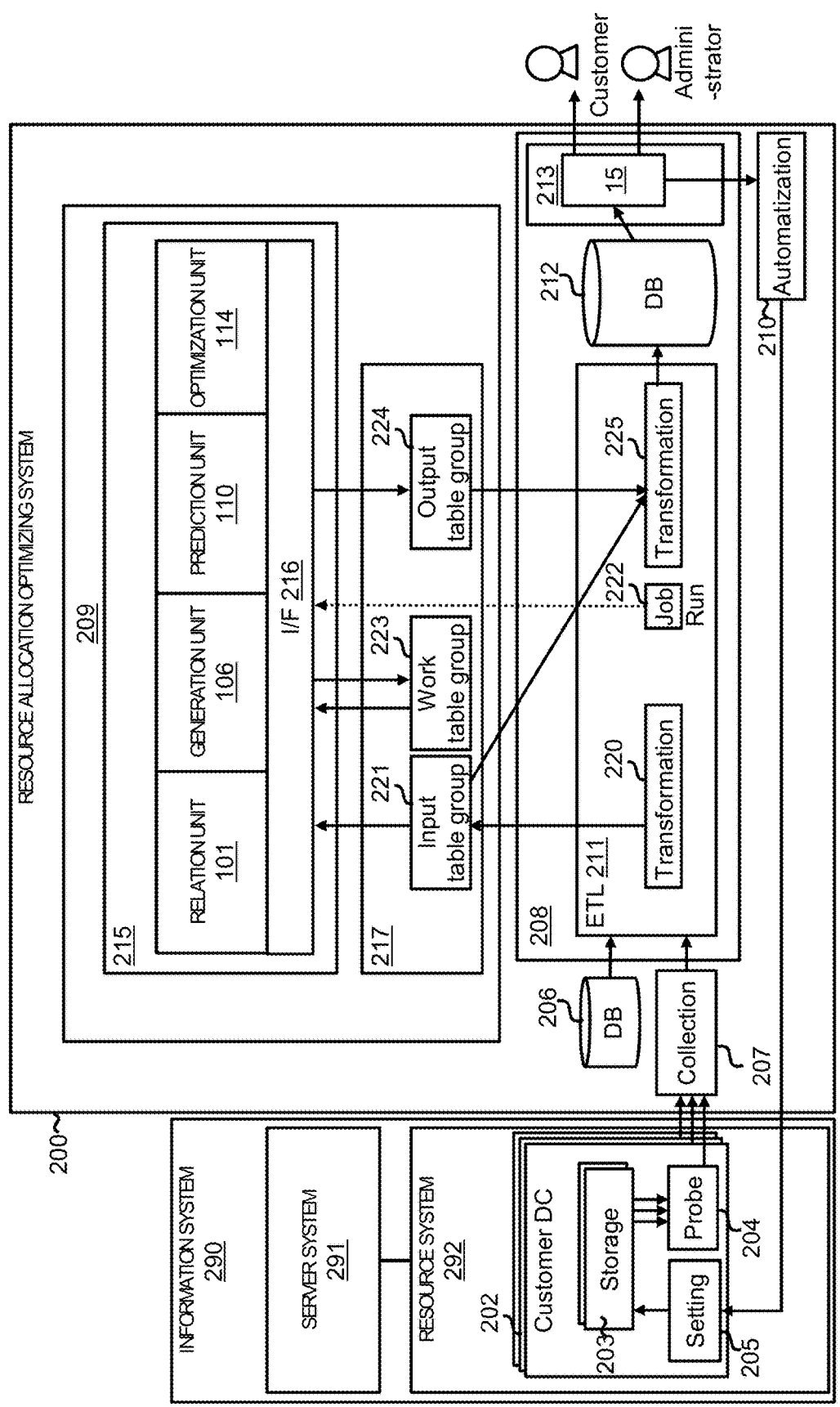
FIG. 2 is a configuration diagram of the entire system according to the embodiment.

FIG. 2 is a configuration diagram of the entire system according to the present embodiment.

The resource allocation optimizing system 200 is connected to the information system 290.

The information system 290 is roughly classified into a server system 291 and a resource system 292.

The server system 291 is a system providing the service 102. Specifically, the server system 291 is one or more servers, and provides a plurality of services 102 by executing a plurality of (for example, several thousands) applications.

The resource system 292 is a system including a plurality of resources for a plurality of services 102. Specifically, the resource system 292 includes one or more customer data centers 202. Each of the customer data centers 202 includes one or more storage devices 203, a probe 204 which collects configuration data and performance data, and a setting tool 205 which allocates an internal component (resource) of the storage device 203. Each storage device 203 is a physical storage device. Each of the probe 204 and the setting tool 205 may be a physical device, and may be a function realized by a processor unit executing a computer program. The "configuration data" is data indicating a configuration of the storage device 203. The "performance data" is data indicating the performance of the storage device 203.

The resource allocation optimizing system 200 includes a customer (user) database 206, a collecting tool 207, a second server 208, a first server 209, and an automatization tool 210. The customer database 206 is stored in a storage section of the resource allocation optimizing system 200. Each of the collecting tool 207 and the automatization tool 210 may be a physical device, and may be a function realized by a processor unit executing a computer program.

The customer database 206 includes information indicating a correspondence relationship between the service 102 and a logical device (LDEV) and information indicating a service level (response time) of each service 102 for each customer. The LDEV is a logical device (logical volume) provided by the storage device 203.

The collecting tool 207 collects configuration data and performance data from the probe 204 of each customer data center 202.

The second server 208 includes an extract, transform, and load (ETL) tool 211, an output database 212, and a business application (BA) tool 213. The ETL tool 211 includes an input transformation unit 220, an output transformation unit 225, and a job execution unit 222. The output database 212 is a database including information displayed on a management screen 15. The BA tool 213 performs display on the management screen 15 or calling of the automatization tool 210.

The first server 209 includes a table group 217, and an analysis program 215 which performs an analysis process.

The table group 217 includes an input table group 221, a work table group 223, and an output table group 224. Each of the table groups 221, 223, and 224 are one or more tables.

The analysis program 215 includes a program interface (I/F) 216, the relation unit 101, the generation unit 106, the prediction unit 110, and the optimization unit 114.

The resource allocation optimizing system 200 performs, for example, the following process.

In other words, the input transformation unit 220 of the ETL tool 211 transforms data from the customer database 206 and the collecting tool 207, and stores the transformed data in the input table group 221.

In a case where the job execution unit 222 of the ETL tool 211 executes a job, functions (programs) 101, 106, 110, and 114 on the analysis program 215 are sequentially executed. The analysis program 215 inputs the input table group 221 thereto, temporarily stores data in the work table group 223, and stores a result in the output table group 224 by using the work table group 223.

The output transformation unit 225 of the ETL tool 211 transforms data from the output table group 224 (and the input table group 221), and stores the transformed data in the output database 212.

The BA tool 213 acquires data from the output database 212, and displays the management screen (typically, a graphical user interface (GUI)) 15 on which information based on the data is displayed. The management screen 15 may be specific to a customer, and may be specific to an administrator. In a case where the BA tool 213 is instructed to allocate a resource via the management screen 15, the BA tool 213 calls the automatization tool 210. The called automatization tool 210 instructs the setting tool 205 to allocate a resource (to add or reduce a resource group in a capacity determined by the optimization unit 114). The setting tool 205 allocates a resource (adds or reduces a resource group in a capacity determined by the optimization unit 114) in response to the instruction.

Each of the server system 291 and the resource system 292 is an example of a computer system. At least one of the server system 291 and the resource system 292 may be a system providing a cloud service. The server system 291 may be one or more physical servers (for example, a cluster of servers), and may include at least one virtual server (for example, a virtual machine (VM)). Specifically, for example, in the information system 290, the server system 291 may be a virtual server executed on the customer data center 202 of the resource system 292. In the resource system 292, some of the storage devices 203 may be virtual storage devices. The information system 290 may execute Software-Defined anything (SDx). SDx may employ, for example, Software Defined Storage (SDS) or Software-defined Datacenter (SDDC). SDS and a virtual server may be executed on an identical computer system.

Adding and reducing of a capacity may be relative. Specifically, for example, moving the service 102 (application) between the customer data centers 202 may be to add or reduce a capacity to or from the service 102.

Figure 3:
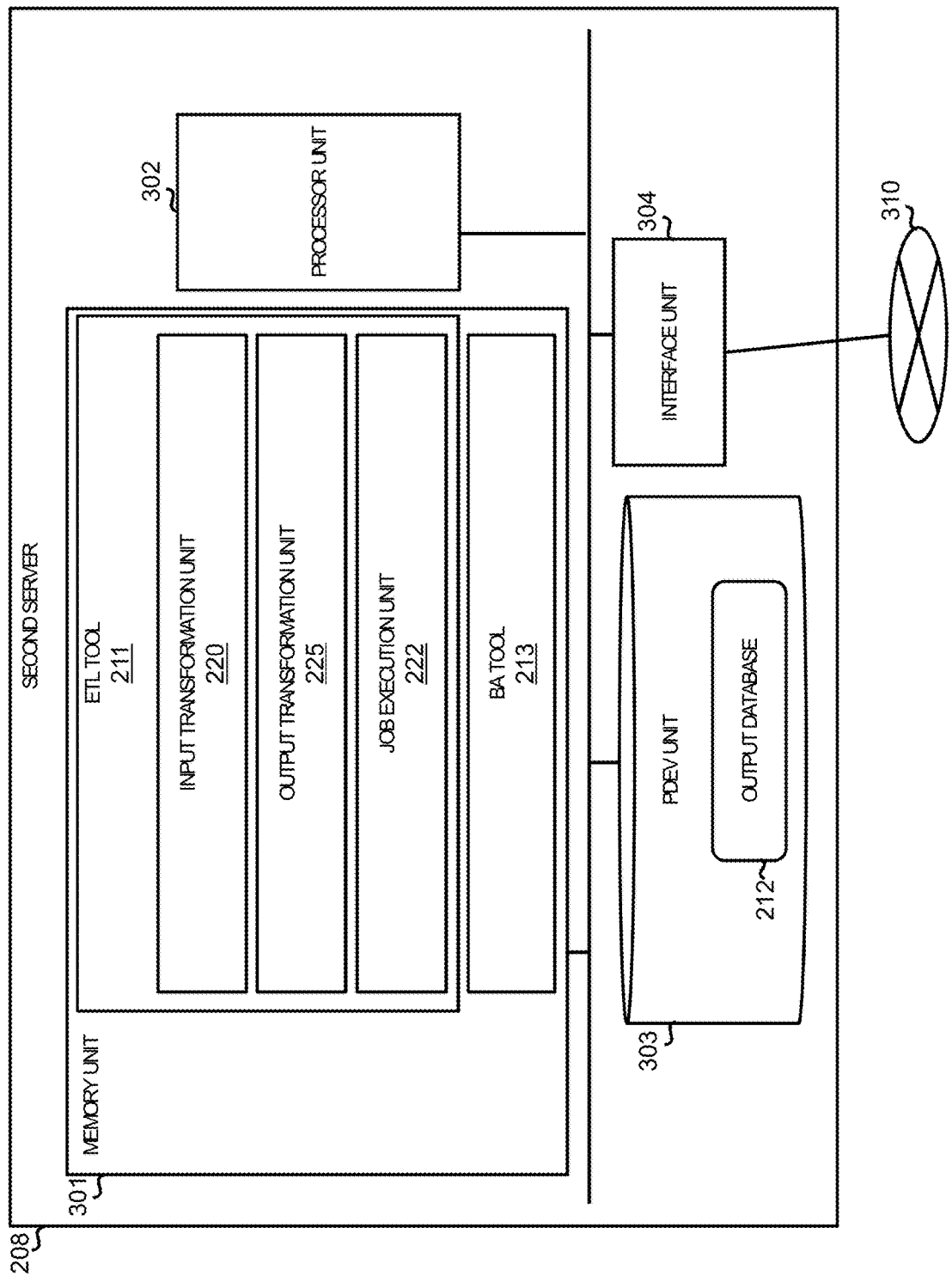
FIG. 3 is a configuration diagram of a second server.

FIG. 3 is a configuration diagram of the second server 208.

The second server 208 includes an interface unit 304, a PDEV unit 303, a memory unit 301, and a processor unit 302 connected to the above-described elements. The interface unit 304 is connected to a communication network 310 such as the Internet.

The memory unit 301 stores the ETL tool 211 (the input transformation unit 220, the output transformation unit 225, and the job execution unit 222) and the BA tool 213, and the processor unit 302 executes the tools (programs) 211 and 213.

The PDEV unit 303 stores the output database 212.

Input information from the customer database 206 and the collecting tool 207, input and output information exchanged with the first server 209, and input and output information exchanged from a remote terminal (for example, a terminal of a customer or an administrator) via a web browser are input and output via the interface unit 304.

The input transformation unit 220 performs a process of transforming configuration data (for example, data in Comma Separated Values (CSV)) into data for the input table group 221 and a process of transforming performance data (for example, data in CSV) into data for the input table group 221. The performance data may include date times and measured values (a measured I/O load, a measured response time, and a measured metric).

The output transformation unit 225 performs a process of transforming data in the output table group 224 (and the input table group 221) into data for the output database 212.

The BA tool 213 performs a process of displays the management screen on which information based on data in the output database 212 is displayed.

Figure 4:
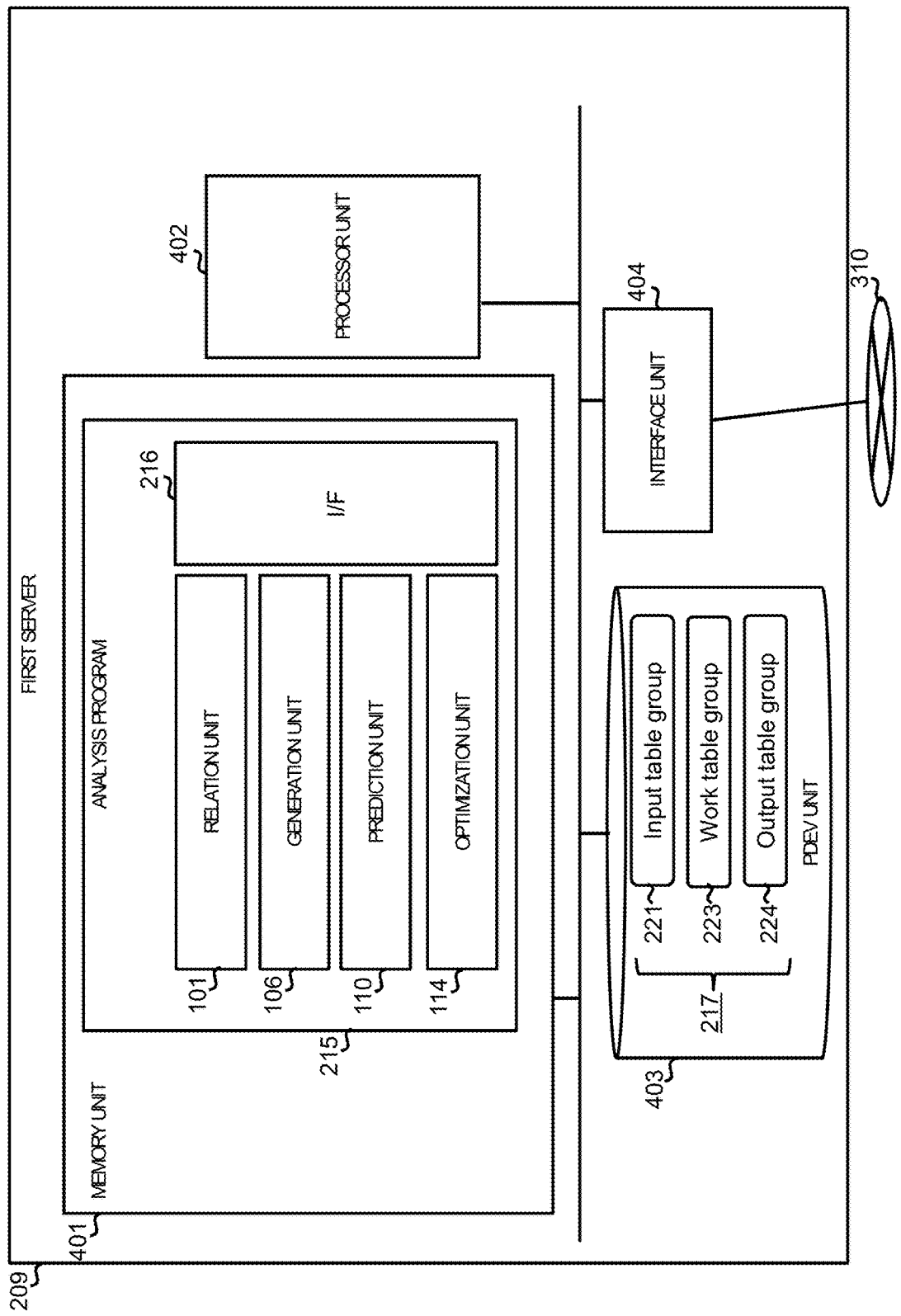
FIG. 4 is a configuration diagram of a first server.

FIG. 4 is a configuration diagram of the first server 209.

The first server 209 includes an interface unit 404, a PDEV unit 403, a memory unit 401, and a processor unit 402 connected to the above-described elements. The interface unit 404 is connected to the communication network 310 such as the Internet.

The memory unit 401 stores the analysis program. 215 (the I/F 216, the relation unit 101, the generation unit 106, the prediction unit 110, and the optimization unit 114), and the processor unit 402 executes the program 215.

The PDEV unit 403 stores the table group 217 (the input table group 221, the work table group 223, and the output table group 224).

Input and output information exchanged with the second server 208 is input and output via the interface unit 404.

Figure 5:
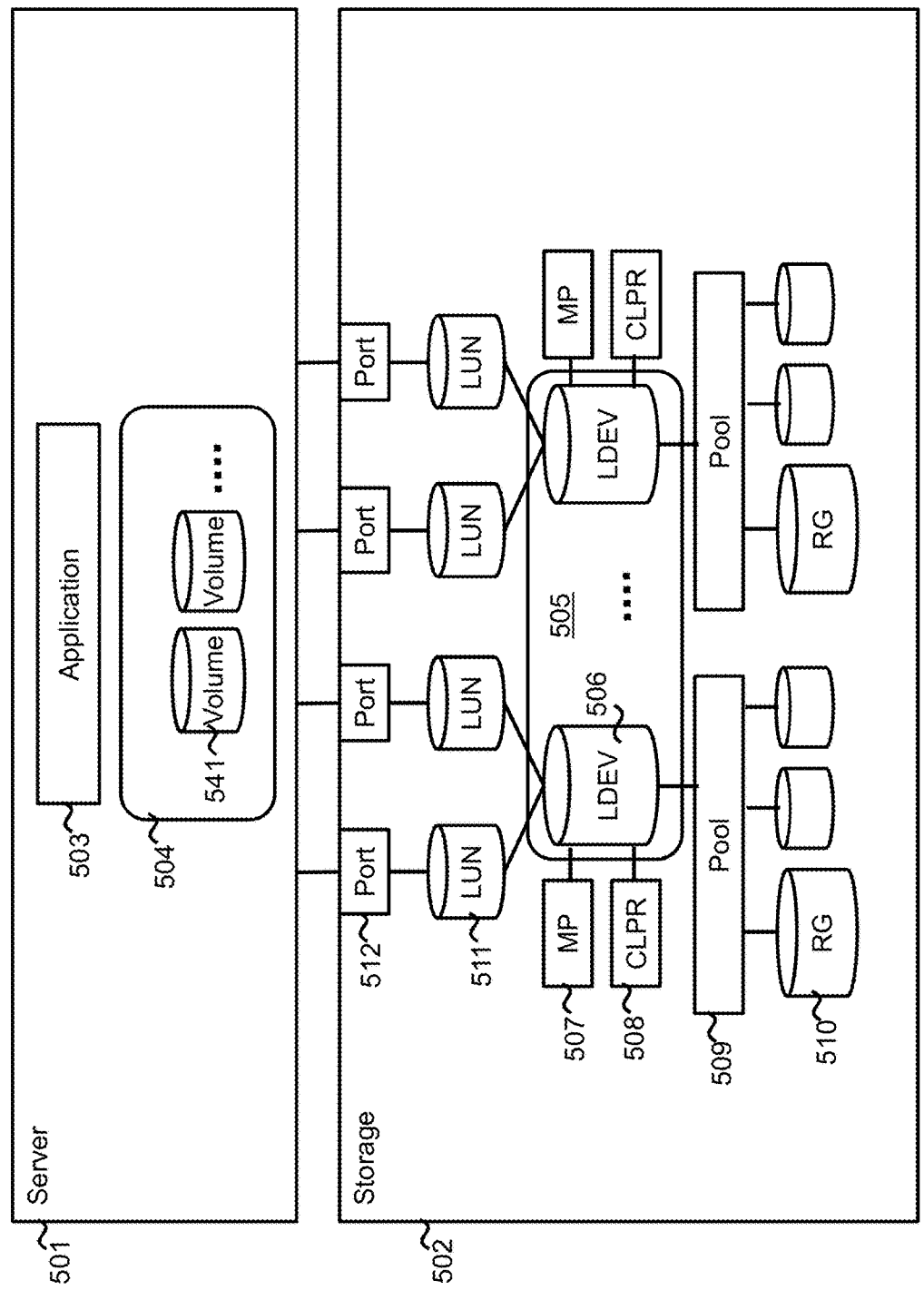
FIG. 5 is a diagram illustrating relation between a service (application) and a resource (an internal component of a storage device).

FIG. 5 is a diagram illustrating relation between the service 102 (application) and a resource (an internal component of the storage device 203).

A server 501 is a physical or virtual server in the server system 291. The server 501 executes an application 503, and thus the service 102 is provided. The application 503 uses a storage region 504 of the server 501. The storage region 504 is one or more volumes 541. Each volume 541 is mounted with an LDEV 506 provided by the storage device 203. The volume 541 may be, for example, a volume storing a transaction log, a volume storing user data, or a volume storing system management information. Data which has the volume 541 as a storage destination is stored in the LDEV 506.

The storage device 203 includes an interface unit, a PDEV unit, a memory unit, and a processor unit connected to the above-described elements. An example of the interface unit is a plurality of ports 512. An example of the PDEV unit is one or more RAID groups (RGs) 510. An example of the memory unit is one or more cache storage devices. An example of the processor unit is one or more microprocessors (MPs) 507.

The ports 512 are connected to the server 501.

One or more pools 509 are configured on the basis of one or more RGs 510. Each pool 509 is a logical storage space, and is an aggregation of a plurality of logical regions (logical storage regions). The LDEV 506 is a virtual volume conforming to the Thin Provisioning technique, and is provided to the server 501. The LDEV 506 is related with the pool 509. A logical region in the pool 509 related with the LDEV 506 is allocated to a write source in the LDEV 506 by the MP 507 related with the LDEV 506.

The LDEV 506 is related with the MP 507, a cache logical partition (CLPR) 508, the pool 509, and a logical unit number (LUN) 511. The pool 509 is related with the RG 510, and thus the LDEV 506 is indirectly related with the RG 510. The CLPR 508 is a partial region of one or more cache storage devices. The LUN 511 is an ID provided to the server 501 of the LDEV 506. According to the example illustrated in FIG. 5, the server 501 can access the LDEV 506 by using either of the two LUNs 511 for the identical LDEV 506 (alternate path). The LUN 511 is related with the port 512, and thus the LDEV 506 is indirectly related with the port.

Resolutions which are allocable to the service 102 are the LDEV 506 used by the application 503 providing the service 102, and the MP 507, the CLPR 508, the pool 509, and the port 512 related with the LDEV 506.

FIG. 6 is a configuration diagram of the input table group 221.

The input table group 221 includes a configuration table 601, an relation table 602, a measured response performance table 603, a response time threshold table 604, a measured metric table 605, and a metric threshold table 606.

The configuration table 601 stores an relation between the service 102 and the LDEV 506. Specifically, for example, the configuration table 601 stores the following information for each service 102.

A service ID 611 (indicating an ID of the service 102)
A host storage domain ID 612 (indicating an ID of the storage region 504 (505) related with the service 102)
A storage ID 613 (indicating an ID of the storage device 203 having the LDEV 506 corresponding to the volume 541 in the storage region 504 related with the service 102)
An LDEV_ID 614 (indicating an ID of the LDEV 506 corresponding to the volume 541 in the storage region 504 related with the service 102)

The relation table 602 stores an relation between the LDEV 506 and a component of the storage device 203. Specifically, for example, the relation table 602 stores the following information for each LDEV 506.

A storage ID 621 (indicating an ID of the storage device 203 having the LDEV 506)
An LDEV_ID 622 (indicating an ID of the LDEV 506)
A component type 623 (indicating the type of component related with the LDEV 506)
A component ID 624 (indicating an ID of the component related with the LDEV 506)
A capacity 625 (indicating an amount of a resource group (component group) related with the LDEV 506)

A total of capacities 625 of one or more LDEVs 506 related with the service 102 corresponds to a capacity of the service 102.

The measured response performance table 603 stores a measured response performance of each service 102. Specifically, for example, the measured response performance table 603 includes the following information for each date time.

A date time 631 (indicating a response time)
A service ID 632 (indicating an ID of the service 102)
A measured I/O load 633 (indicating a measured I/O load)
A measured response time 634 (indicating a measured response time)

In the present embodiment, the unit of a date time is, for example, year, month, day, hour, minute, and second, but may be finer or rougher than that.

The response time threshold table 604 stores a response time threshold of each service 102. Specifically, for example, the response time threshold table 604 includes the following information for each service 102.

- A service ID 641 (indicating an ID of the service 102)
- Importance 642 (indicating importance of the service 102)
- A response time threshold 643 (indicating a threshold of a response time)

In the present embodiment, relation, prediction model generation, and prediction and optimization may be preferentially performed from the service 102 of which the importance 642 is high.

The measured metric table 605 stores a measured metric of each resource (component). Specifically, for example, the measured metric table 605 includes the following information for each date time.

- A date time 651 (indicating a date time)
- A storage ID 652 (indicating an ID of the storage device 203 having a component)
- A component ID 653 (indicating an ID of a component)
- A metric type 654 (indicating the type of metric)
- A measured metric 655 (indicating a measured metric)

A measured metric of a resource allocated to the service 102 can be acquired by referring to the configuration table 601, the relation table 602, and the measured metric table 605.

The metric threshold table 606 stores a metric threshold of each component (resource). Specifically, for example, the metric threshold table 606 includes the following information for each component.

- A storage ID 661 (indicating an ID of the storage device 203 having a component)
- A component type 662 (indicating the type of the component)
- A component ID 663 (indicating an ID of the component)
- A metric type 664 (indicating the type of metric)
- A metric threshold 665 (indicating a metric threshold)

FIG. 7 is a configuration diagram of the work table group 223.

The work table group 223 includes an I/O load prediction model table 701, a response time prediction model table 702, and a metric prediction model table 703.

The I/O load prediction model table 701 stores information regarding the I/O load prediction model 107. Specifically, for example, the I/O load prediction model table 701 includes the following information for each prediction model 107.

- A model ID 711 (indicating an ID of the prediction model 107)
- A start date time 712 (indicating a start date time of a learning period)
- An end date time 713 (indicating an end date time of the learning period)
- A service ID 714 (indicating an ID of the service 102 corresponding to the prediction model 107)
- A function expression f(t) 715 (information corresponding to the prediction model 107 for obtaining an output, with a date time (t) as an input)

The response time prediction model table 702 stores information regarding the response time prediction model 108. Specifically, for example, the response time prediction model table 702 includes the following information for each prediction model 108.

- A model ID 721 (indicating an ID of the prediction model 108)
- A start date time 722 (indicating a start date time of a learning period)
- An end date time 723 (indicating an end date time of the learning period)
- A service ID 724 (indicating an ID of the service 102 corresponding to the prediction model 108)
- A function expression f(I/O load) 725 (information corresponding to the prediction model 108 for obtaining an output, with an I/O load as an input)

The metric prediction model table 703 stores information regarding the metric prediction model 109. Specifically, for example, the metric prediction model table 703 includes the following information for each prediction model 109.

- A model ID 731 (indicating an ID of the prediction model 109)
- A start date time 732 (indicating a start date time of a learning period)
- An end date time 733 (indicating an end date time of the learning period)
- A storage ID 734 (indicating an ID of the storage device 203 having a component)
- A component ID 735 (indicating an ID of the component)
- A metric type 736 (indicating the type of metric)
- A function expression f(I/O load) 737 (information corresponding to the prediction model 109 for obtaining an output, with an I/O load as an input)

FIG. 8 is a configuration diagram of the output table group 224.

The output table group 224 includes an relation table 801, a predicted response performance table 805, a predicted metric table 808, and a predictive judgement result table 809.

The relation table 801 stores information indicating an relation between the service 102 and a component (resource). Specifically, for example, the relation table 801 includes the following information for each service 102.

- A service ID 811 (indicating an ID of the service 102)
- A storage region ID 812 (indicating an ID of the storage region 504 (505) related with the service 102)
- A storage ID 813 (indicating an ID of the storage device 203 having the LDEV 506 corresponding to the volume 541 in the storage region 504 related with the service 102)
- A component type 814 (indicating the type of component related with the service 102)
- A component ID 815 (indicating an ID of the component related with the service 102)

The predicted response performance table 805 stores a predicted response performance of each service 102. Specifically, for example, the predicted response performance table 805 includes the following information for each date time.

- A date time 851 (indicating a response time)
- A service ID 852 (indicating an ID of the service 102)
- A predicted I/O load 853 (indicating a predicted I/O load)
- A predicted response time 854 (indicating a predicted response time)

The predicted metric table 808 stores a predicted metric of each resource (component). Specifically, for example, the predicted metric table 808 includes the following information for each date time.

A date time 881 (indicating a date time)

A storage ID 882 (indicating an ID of the storage device 203 having a component)

A component ID 883 (indicating an ID of a component)

A metric type 884 (indicating the type of metric)

A predicted metric 885 (indicating a predicted metric)

The predictive judgement result table 809 stores a result of a predictive judgement for each service 102. Specifically, for example, the predictive judgement result table 809 includes the following information for each service 102.

A service ID 891 (indicating an ID of the service 102)

A start date time 892 (indicating a start date time of a designated prediction period)

An end date time 893 (indicating an end date time of the designated prediction period)

An tolerance 894 (indicating an tolerance of a difference between a measured value and a predicted value of an I/O load)

A predictive judgement result 895 (indicating a result of a predictive judgement)

The optimization unit 114 determines whether or not a predicted I/O load is within an tolerance with respect to a measured I/O load by using the tolerance 894. The tolerance 894 may be designated, such as a range of 10% of a variance σ with respect to a predicted I/O load. The predictive judgement result table 809 corresponds to the aggregation 80 illustrated in FIG. 1.

The tables of the output table group 224 are stored in the output database 212 for display of the management screen 15, but, in addition to the tables of the output table group 224, the tables (for example, the measured response performance table 603, the response time threshold table 604, the measured metric table 605, and the metric threshold table 606) of the input table group 221 may be stored in the output database 212.

Figure 9:
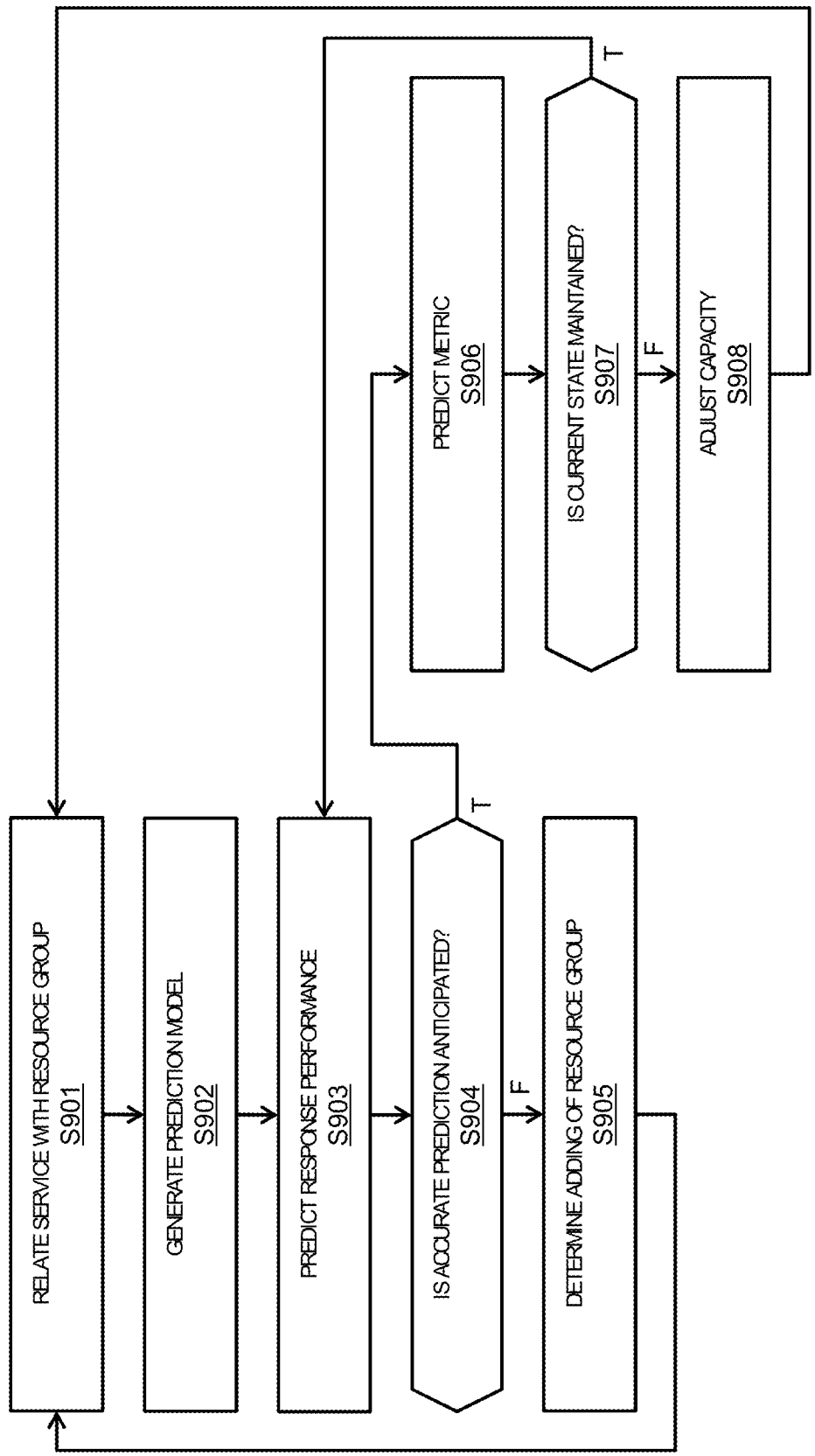
FIG. 9 illustrates a flow of relation, prediction model generation, prediction, and optimization.

FIG. 9 illustrates a flow of relation, prediction model generation, prediction, and optimization. Hereinafter, a single service 102 is taken as an example.

The relation unit 101 relates the resource group 103 with the service 102 (S901).

With respect to the service 102, the generation unit 106 generates the prediction models 107 to 109 through a learning process using time-series measured I/O loads, time-series measured response times, and time-series measured metrics in an actual learning period (a period in which a measured response time is equal to or less than a response time threshold in a designated learning period) (S902).

The prediction unit 110 predicts time-series response performances (I/O loads and response times) in the designated prediction period by using the prediction models 107 and 108 corresponding to the service 102 (S903).

The optimization unit 114 performs a predictive judgement which is a determination of whether or not an accurate prediction of an I/O load of the service 102 can be anticipated on the basis of the time-series measured response performances and the time-series predicted response performances (S904).

In a case where a determination result in S904 is false (S904: F), the optimization unit 114 determines adding of a resource group (for example, a predetermined amount of a resource group) to the service 102.

In a case where a determination result in S904 is true (S904: T), the prediction unit 110 predicts time-series metrics in a designated prediction period of each resource of the resource group 103 related with the service 102 by using the prediction model 109 corresponding to the resource (S906). The optimization unit 114 performs a maintenance determination which is a determination of whether or not a capacity of the resources is currently maintained on the basis of at least one of the time-series predicted metrics and the time-series measured metrics (S907).

In a case where a determination result in S907 is false (S907: F), the optimization unit 114 determines adjustment of the capacity with respect to the service 102 (S908). For example, the optimization unit 114 determines a capacity to be reduced or added on the basis of a difference between the measured metric or the predicted metric and a metric threshold.

Figure 10:
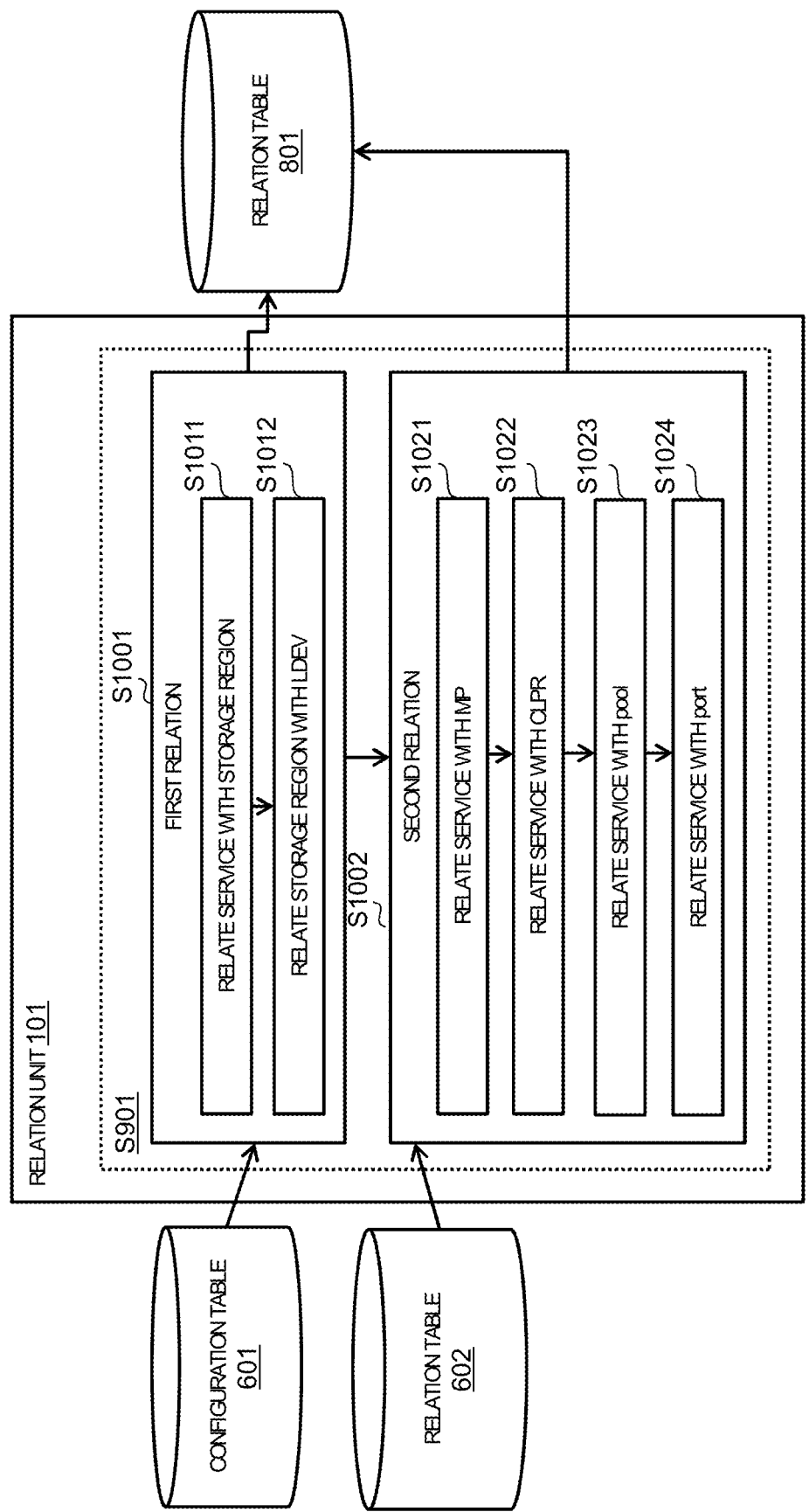
FIG. 10 illustrates a flow of a process performed by a relation unit.

FIG. 10 illustrates a flow of a process performed by the relation unit 101.

In S901, the relation unit 101 performs a first relation (S1001) and a second relation (S1002).

The first relation is an relation between the service 102 and the LDEV 506. Specifically, the relation unit 101 inputs the configuration table 601 thereto, performs an relation between the service 102 and the storage region 504 (S1011) and an relation between the storage region 504 and the LDEV 506 (S1012), and stores execution results in the relation table 801.

The second relation is an relation between the service 102 and a component. Specifically, the relation unit 101 inputs the relation table 602 thereto, performs an relation between the service 102 and the MP 507 (S1021), an relation between the service 102 and the CLPR 508 (S1022), an relation between the service 102 and the pool 509 (S1023), and an relation between the service 102 and the port 512 (S1024), and stores execution results in the relation table 801.

Figure 11:
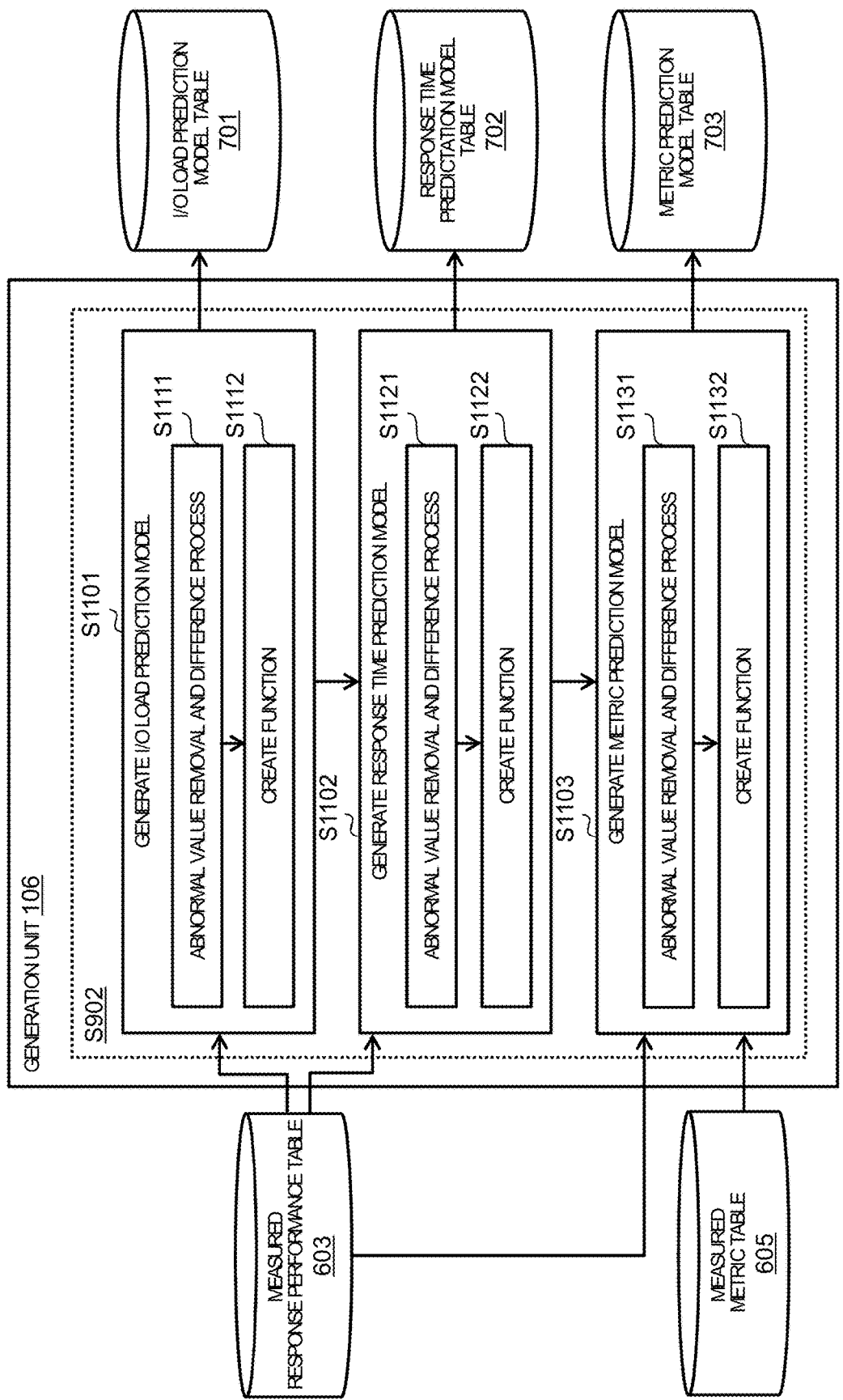
FIG. 11 illustrates a flow of a process performed by a generation unit.

FIG. 11 illustrates a flow of a process performed by the generation unit 106.

In S902, the generation unit 106 performs generation of the I/O load prediction model 107 (S1101), generation of the response time prediction model 108 (S1102), and generation of the metric prediction model 109 (S1103).

In S1101, the generation unit 106 inputs the measured response performance table 603 thereto. The generation unit 106 performs abnormal value removal, a difference process (S1111), a process (S1112) of creating a function (prediction expression) by using an ARIMA model, in an actual learning period of a designated learning period, and stores execution results in the I/O load prediction model table 701.

In S1102, the generation unit 106 inputs the measured response performance table 603 thereto. The generation unit 106 performs abnormal value removal, a difference process (S1121), a process (S1122) of creating a function (prediction expression) by using the ARIMA model, in the actual learning period of the designated learning period, and stores execution results in the response time prediction model table 702.

In S1103, the generation unit 106 inputs the measured metric table 605 thereto. The generation unit 106 performs abnormal value removal, a difference process (S1131), a process (S1132) of creating a function (prediction expression) by using the ARIMA model, in the actual learning period of the designated learning period, and stores execution results in the metric prediction model table 703.

Figure 12:
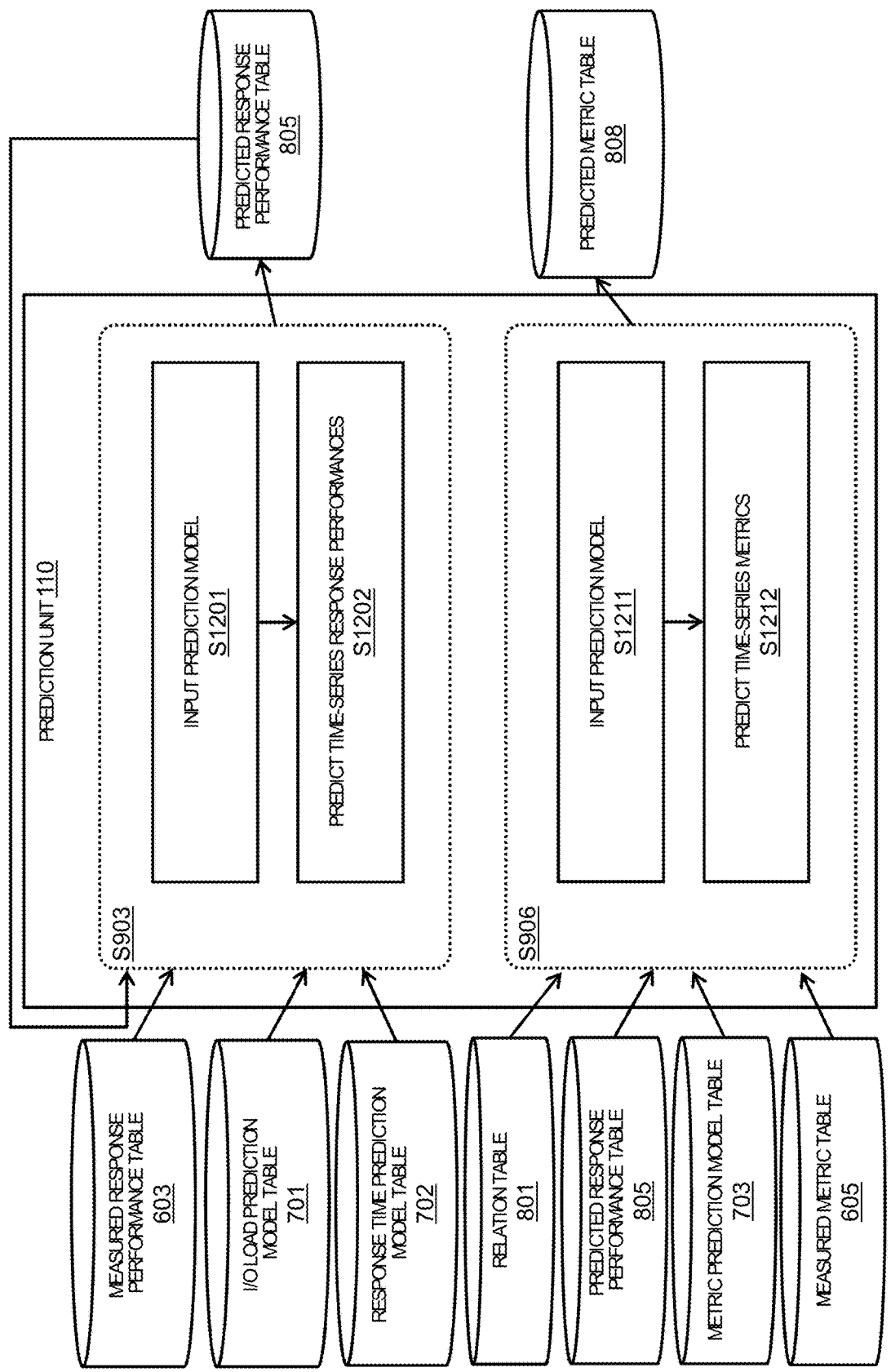
FIG. 12 illustrates a flow of a process performed by a prediction unit.

FIG. 12 illustrates a flow of a process performed by the prediction unit 110.

In S903, the prediction unit 110 predicts an I/O load and a response time.

In the prediction of an I/O load, the prediction unit 110 inputs the I/O load prediction model table 701 thereto (S1201). The prediction unit 110 predicts time-series I/O loads with time-series n date times in the designated prediction period and time-series n measured I/O loads in a usage actual measurement period as inputs by using a prediction expression (that is, the prediction model 107 as a function) in the table 701 (S1202). As a result, time-series n predicted I/O loads are acquired. The prediction unit 110 stores the prediction results in the predicted response performance table 805.

In the prediction of a response time, the prediction unit 110 inputs the response time prediction model table 702 thereto (S1201). The prediction unit 110 predicts time-series response times with time-series n predicted I/O loads (time-series n predicted I/O loads respectively corresponding to the time-series n date times in the designated prediction period) in the predicted response performance table 805 and time-series n measured response times in the usage actual measurement period as inputs by using a prediction expression (that is, the prediction model 108 as a function) in the table 702 (S1202). As a result, time-series n predicted response times are acquired. The prediction unit 110 stores the prediction results in the predicted response performance table 805.

In S906, the prediction unit 110 inputs the relation table 801 and the metric prediction model table 703 thereto (S1211). Consequently, the metric prediction model 109 of a resource (component) related with the service 102 can be specified. The prediction unit 110 predicts time-series metrics with the time-series n predicted I/O loads (the time-series n predicted I/O loads respectively corresponding to the time-series n date times in the designated prediction period) in the predicted response performance table 805 and time-series n measured metrics in the usage actual measurement period as inputs by using a prediction expression (that is, the prediction model 109 as a function) in the table 703 (S1212). As a result, time-series n predicted metrics are acquired. The prediction unit 110 stores the prediction results in the predicted metric table 808.

Figure 13:
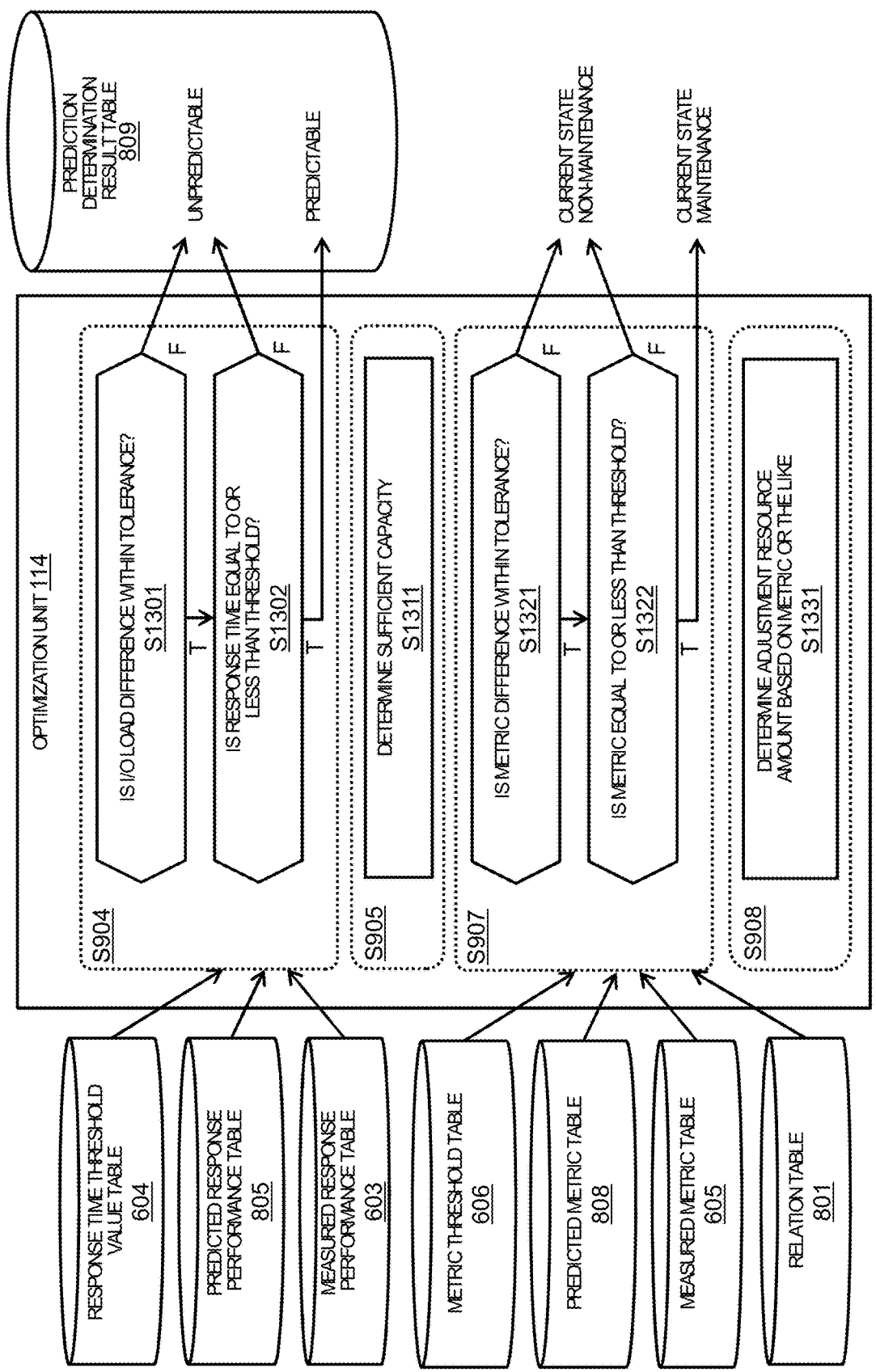
FIG. 13 illustrates a flow of a process performed by an optimization unit.

FIG. 13 illustrates a flow of a process performed by the optimization unit 114.

In S904, the optimization unit 114 inputs the response time threshold table 604, the predicted response performance table 805, and the measured response performance table 603 thereto. The optimization unit 114 determines whether or not a difference between the measured I/O load and the predicted I/O load in the designated prediction period is within a predetermined tolerance (within a margin) (S1301). In a case where a determination result in S1301 is false (S1301: F), the optimization unit 114 stores "unpredictable" in the predictive judgement result table 809 as the predictive judgement result 895 with respect to the service 102.

In a case where a determination result in S1301 is true (S1301: T), the optimization unit 114 determines whether or not at least one of the measured response time and the predicted response time in the designated prediction period is equal to or less than the response time threshold (S1302). In a case where a determination result in S1302 is false (S1302: F), the optimization unit 114 stores "unpredictable" in the predictive judgement result table 809 as the predictive judgement result 895 with respect to the service 102. On the other hand, in a case where a determination result in S1302 is false (S1302: T), the optimization unit 114 stores "predictable" in the predictive judgement result table 809 as the predictive judgement result 895 with respect to the service 102.

In S905, the optimization unit 114 determines a sufficient capacity (S1311). The "sufficient capacity" mentioned here is a capacity in which a measured response time in the designated learning period is sufficiently anticipated to be equal to or less than the response time threshold. The capacity to be added is, for example, a predetermined amount of resources.

In S907, the optimization unit 114 inputs the metric threshold table 606, the predicted metric table 808, the measured metric table 605, and the relation table 801 thereto. The optimization unit 114 determines whether or not a difference between the measured metric and the predicted metric in the designated prediction period is within a predetermined tolerance (S1321). In a case where a determination result in S1321 is false (S1321: F), current state non-maintenance is obtained (that is, a result of the maintenance determination (S907) is false).

In a case where a determination result in S1321 is true (S1321: T), the optimization unit 114 determines whether or not at least one of the measured metric and the predicted metric in the designated prediction period is equal to or less than the metric threshold (S1322). In a case where a determination result in S1322 is false (S1322: F), current state non-maintenance is obtained. On the other hand, in a case where a determination result in S1322 is true (S1322: T), current state maintenance is obtained (that is, a result of the maintenance determination (S907) is true).

In S908, the optimization unit 114 determines an adjustment capacity on the basis of the metric or the like (S1331). Specifically, for example, the optimization unit 114 determines the adjustment capacity on the basis of a measured metric exceeding the metric threshold or a difference between the predicted metric and the metric threshold.

Figure 14:
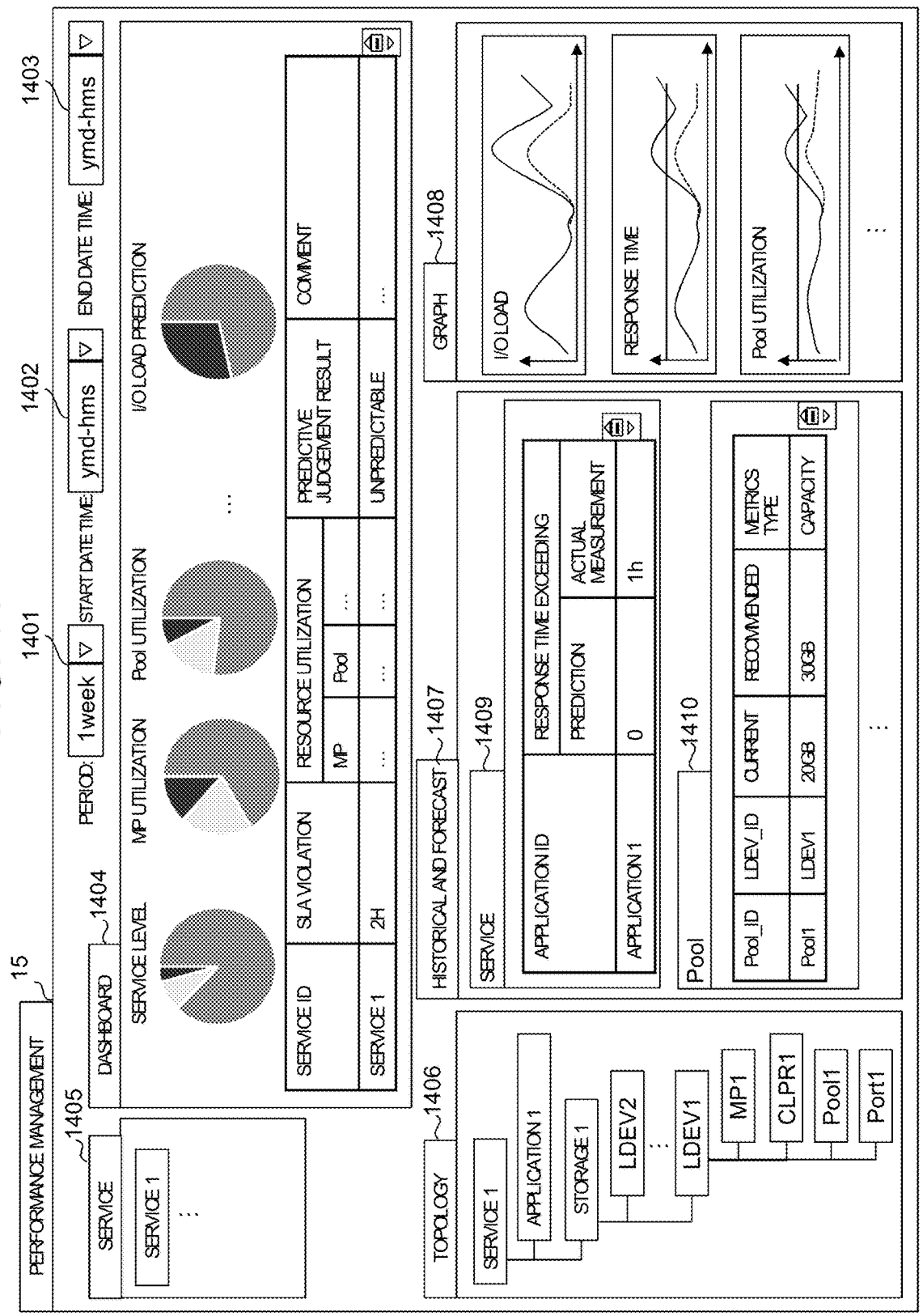
FIG. 14 illustrates an example of a management screen.

FIG. 14 illustrates an example of the management screen 15.

Management information which is information displayed on the management screen 15 is based on data in the output database 212. The management screen 15 is, for example, a graphical user interface (GUI).

The management screen 15 has a user interface (UI) 1401 for designating an analysis period, a UI 1402 for designating a start date time, and a UI 1403 for designating an end date time. A period is designated by using the UIs 1401 to 1403. Information based on data included in the designated period (hereinafter, a display period) is management information displayed on the management screen 15. The display period may include a past period, and may include a future period. Display of information on the management screen 15 is controlled by the BA tool 213 in the present embodiment, and the BA tool 213 is an example of a display control unit. The display control unit may be provided in the first server 209 instead of the second server 208.

In the present embodiment, the management information is the whole or part (information displayed in, for example, a dashboard region 1404) of information displayed in a service region 1405, the dashboard region 1404, a topology region 1406, a historical and forecast region 1407, and a graph region 1408.

A list of the services 102 is displayed in the service region 1405. A display object of the service 102 corresponding to a predetermined condition is displayed in an emphasis manner in the service region 1405. The "service 102 corresponding to a predetermined condition" may be any service 102 among the following services 102.

The service 102 selected by an operator (for example, an administrator or a user)
  The service 102 violating a service level agreement (SLA) (the service 102 in which a measured response time or a predicted response time exceeds a response time threshold)

The service 102 in which a measured metric or a predicted metric exceeds a metric threshold The service 102 for which a result of a predictive judgement is false A service level compliance situation (herein, whether or not a measured response time or a predicted response time is equal to or less than a response time threshold) of all the services 102, a resource usage situation (whether or not a measured metric or a predicted metric is equal to or less than a metric threshold) related to all the services 102, and predictive judgement results (the number or a ratio of services 102 for which predictive judgement results are false) for all the services 102 are displayed in the dashboard region 1404. A list of the "services 102 corresponding to predetermined condition", and an SLA violation period, a metric of each component (resource), and a result of a predictive judgement for each service 102 are displayed in the dashboard region 1404.

Topology with the "service 102 corresponding to a predetermined condition" as a root node is displayed in the topology region 1406. In the topology, the application 503 related to the service 102 or a component related with the LDEV 506 is a leaf node. A display object of an abnormal node is displayed in an emphasis manner in the topology region 1406. The "abnormal node" may be a leaf node (for example, the application 503 or the pool 509) or a parent node (for example, the LDEV 506 related with the pool 509) of the leaf node.

Detailed information of an abnormal node (for example, a node selected by an operator) in the topology displayed in the topology region 1406 is displayed in the historical and forecast region 1407. The detailed information includes a service performance 1409 (for example, an application ID, and accumulated times exceeding a response time for each of a predicted response time and a measured response time) and a resource metric 1410 (for example, the metric type of component, and the current capacity and a recommended capacity regarding the metric type). The "recommended capacity" is a capacity determined by the optimization unit 114. In a case where the operator enters approval for the recommended capacity to the management screen 15, the BA tool 213 may give an instruction for adding or reducing an adjustment capacity which is a difference between the recommended capacity and the current capacity, to the resource system 292 by calling the automatization tool 210.

A graph (a graph in which a transverse axis expresses a date time, and a longitudinal axis expresses a measured value or a predicted value) for each of the service performance 1409 and the resource metric 1410 is displayed in the graph region 1408. A response time threshold or a metric threshold is also displayed in the graph.

As mentioned above, one embodiment of the present invention has been described, but this is only an example for description of the present invention, and is not intended to limit the scope of the present invention to the embodiment. The present invention may be implemented in various other forms. For example, at least one of the prediction models 107 to 109 may be a linear model instead of a time-series model. For example, in a case where each of the prediction models 107 to 109 is a linear model, inputs may be time-series n date times (numerical values corresponding to respective unit time widths in a designated prediction period), and outputs may be time-series n predicted values (predicted I/O loads, predicted response times, or predicted metrics).

REFERENCE SIGNS LIST

101 RELATION UNIT
106 GENERATION UNIT
110 PREDICTION UNIT
114 OPTIMIZATION UNIT

The invention claimed is:

1. A resource allocation optimizing system comprising: a prediction unit that predicts, with respect to each of a plurality of provided services, time-series workloads and time-series service levels in a first period for the service; an optimization unit that performs, with respect to each of the plurality of services, a predictive judgement which is a determination of whether or not accurate prediction of a workload of the service is able to be anticipated on the basis of at least one of the following (x) and (y), that is, (x) time-series measured workloads and time-series predicted workloads in the first period for the service and (y) at least one of a measured service level and a predicted service level in the first period for the service, and controls allocation of a resource to the service on the basis of a result of the predictive judgement, wherein the optimization unit determines a capacity of each resource in a resource group related with a service for which a result of the predictive judgement is true, on the basis of at least one of a measured metric and a predicted metric in the first period of the resource; and a generation unit that performs a learning process on each of the plurality of services, wherein, with respect to each of the plurality of services, in the learning process on the service, the generation unit generates a workload prediction model in which a date time is an input and a predicted workload is an output, and a service level prediction model in which a predicted workload is an input and a predicted service level is an output, on the basis of time-series measured workloads and time-series measured service levels in a second period for the service, and generates a metric prediction model which is a prediction model of a metric of a resource and in which a predicted workload is an input and a predicted metric is an output, on the basis of time-series measured workloads and time-series measured metrics in the second period for each resource of a resource group related with the service.

2. The resource allocation optimizing system according to claim 1, wherein the optimization unit determines that a resource group is to be added to a service for which a result of the predictive judgement is false.

3. The resource allocation optimizing system according to claim 2, wherein the resource group to be added is a predetermined amount of a resource group.

4. The resource allocation optimizing system according to claim 2, wherein the resource group to be added is a resource group in an amount determined according to at least one of a workload difference and an excessive difference, wherein the workload difference is a difference between a measured workload and a predicted workload, and wherein the excessive difference is a difference between a measured service level or a predicted service level exceeding a service level threshold, and the service level threshold.

5. The resource allocation optimizing system according to claim 1, wherein, in a case where a capacity of a resource group for the service for which the result of the predictive judgement is true is larger than the determined capacity, the optimization unit determines that the capacity of the resource group is to be reduced, and wherein a capacity of the added resource group includes the reduced capacity.

6. The resource allocation optimizing system according to claim 1, wherein, with respect to each resource in the resource group related with the service for which the result of the predictive judgement is true, the optimization unit performs a maintenance determination which is a determination of whether or not a capacity of the resource into be currently maintained, wherein the optimization unit determines a capacity of a resource for which a result of the maintenance determination is false, wherein the maintenance determination includes at least one of determinations in the following (K1) to (K3), (K1) a determination of whether or not time-series measured service levels in the first period are equal to or less than a service level threshold, (K2) a determination of whether or not a difference between a measured metric and a predicted metric in the first period is within a tolerance, and (K3) a determination of whether or not at least one of the measured metric and the predicted metric in the first period is equal to or less than a metric threshold, and wherein, in a case where at least one of determination results in (K1) to (K3) is false, a result of the maintenance determination is false.

7. The resource allocation optimizing system according to claim 1, further comprising: wherein the second period is a period earlier than the first period, and is a period in which a measured service level is equal to or less than a service level threshold in a designated learning period, wherein the generation unit performs relearning process of updating the workload prediction model and the service level prediction model on a service to which the predetermined amount of the resource group is added, and wherein, with respect to a resource for which a result of the maintenance determination is false, but a difference between the measured metric and the predicted metric in the first period is not within an tolerance in the resource group related with the service for which the result of the predictive judgement is true, the optimization unit does not determine a capacity of the resource, and the generation unit performs a relearning process of updating a metric prediction model of the resource on the service.

8. The resource allocation optimizing system according to claim 1, wherein the predictive judgement includes at least one of determinations in the following (P1) and (P2), (P1) a determination of whether or not a difference between a measured workload and a predicted workload is within a tolerance, and (P2) a determination of whether or not at least one of a measured service level and a predicted service level is equal to or less than a service level threshold, and wherein in a case where at least one of determination results in (P1) and (P2) is false, a result of the predictive judgement is false.

9. The resource allocation optimizing system according to claim 8, further comprising: a generation unit that performs a learning process, on each of the plurality of services, of generating a workload prediction model in which a date time is an input and a predicted workload is an output, and a service level prediction model in which a predicted workload is an input and a predicted service level is an output, on the basis of time-series measured workloads and time-series measured service levels in a second period for the service, wherein the second period is a period earlier than the first period, and is a period in which a measured service level is equal to or less than a service level threshold in a designated learning period.

10. The resource allocation optimizing system according to claim 1, wherein the optimization unit determines a capacity of each resource in the resource group related with the service for which the result of the predictive judgement is true, on the basis of at least one of time-series measured metrics and time-series predicted metrics in the first period of the resource.

11. The resource allocation optimizing system according to claim 1, further comprising: a display control unit that displays management information, wherein the management information includes the number or a ratio of services for which a result of the predictive judgement is false for all of the plurality of services in a designated period.

12. The resource allocation optimizing system according to claim 1, wherein, with respect to each of the plurality of services, the workload is an input/output (I/O) load, and the service level is a response time.

13. A resource allocation optimizing method comprising: predicting, with respect to each of a plurality of provided services, time-series workloads and time-series service levels in a predefined period for the service; performing, with respect to each of the plurality of services, a predictive judgement which is a determination of whether or not accurate prediction of a workload of the service is able to be anticipated on the basis of at least one of the following (x) and (y), that is, (x) time-series measured workloads and time-series predicted workloads in the predefined period for the service and (y) at least one of a measured service level and a predicted service level in the predefined period for the service; controlling, with respect to each of the plurality of service, allocation of a resource to the service on the basis of a result of the predictive judgement, determining a capacity of each resource in a resource group related with a service for which a result of the predictive judgement is true, on the basis of at least one of a measured metric and a predicted metric in the first period of the resource; performing a learning process on each of the plurality of services, wherein, with respect to each of the plurality of services, the learning process comprises generating a workload prediction model in which a date time is an input and a predicted workload is an output, and a service level prediction model in which a predicted workload is an input and a predicted service level is an output, on the basis of time-series measured workloads and time-series measured service levels in a second period for the service; and generating a metric prediction model which is a prediction model of a metric of a resource and in which a predicted workload is an input and a predicted metric is an output, on the basis of time-series measured workloads and time-series measured metrics in the second period for each resource of a resource group related with the service.

14. A computer program product embodied on a non-transitory computer readable recording medium causing a computer to execute: predicting, with respect to each of a plurality of provided services, time-series workloads and time-series service levels in a predefined period for the service; performing, with respect to each of the plurality of services, a predictive judgement which is a determination of whether or not accurate prediction of a workload of the service is able to be anticipated on the basis of at east one of the following (x) and (y), that is, (x) time-series measured workloads and time-series predicted workloads in the predefined period for the service and (y) at least one of a measured service level and a predicted service level in the predefined period for the service; controlling, with respect to each of the plurality of services, allocation of a resource to the service on the basis of a result of the predictive judgement, determining a capacity of each resource in a resource group related with a service for which a result of the predictive judgement is true, on the basis of at least one of a measured metric and a predicted metric in the first period of the resource; performing a learning process on each of the plurality of services, wherein, with respect to each of the plurality of services, the learning process comprises generating a workload prediction model in which a date time is an input and a predicted workload is an output, and a service level prediction model in which a predicted workload is an input and a predicted service level is an output, on the basis of time-series measured workloads and time-series measured service levels in a second period for the service; and generating a metric prediction model which is a prediction model of a metric of a resource and in which a predicted workload is an input and a predicted metric is an output, on the basis of time-series measured workloads and time-series measured metrics in the second period for each resource of a resource group related with the service.

* * * * *